(12) United States Patent
Abe et al.

(10) Patent No.: US 11,543,620 B2
(45) Date of Patent: Jan. 3, 2023

(54) LENS BARREL AND IMAGING DEVICE

(71) Applicant: FUJIFILM Corporation, Tokyo (JP)

(72) Inventors: Takeya Abe, Saitama (JP); Kenji Hoshino, Saitama (JP); Hideo Kobayashi, Saitama (JP); Yuichi Kawanabe, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 302 days.

(21) Appl. No.: 16/891,236

(22) Filed: Jun. 3, 2020

(65) Prior Publication Data

US 2020/0292780 A1 Sep. 17, 2020

Related U.S. Application Data

(63) Continuation of application No. PCT/JP2018/040341, filed on Nov. 21, 2018.

(30) Foreign Application Priority Data

Dec. 21, 2017 (JP) .............................. JP2017-245042
Jun. 7, 2018 (JP) .............................. JP2018-109624

(51) Int. Cl.
*G02B 7/04* (2021.01)
*H02K 41/035* (2006.01)

(52) U.S. Cl.
CPC ........... *G02B 7/04* (2013.01); *H02K 41/0356* (2013.01)

(58) Field of Classification Search
CPC ...................................................... G02B 7/04
(Continued)

(56) References Cited

U.S. PATENT DOCUMENTS

2001/0014217 A1 8/2001 Hori
2005/0207744 A1 9/2005 Yano
(Continued)

FOREIGN PATENT DOCUMENTS

| CN | 1882988 A | 12/2006 |
| JP | 55-153911 A | 12/1980 |

(Continued)

OTHER PUBLICATIONS

International Preliminary Report on Patentability (Form PCT/IPEA/409) for International Application No. PCT/JP2018/043041, dated Oct. 30, 2019, with English translation.

(Continued)

*Primary Examiner* — Joel W Fosselman
(74) *Attorney, Agent, or Firm* — Birch, Stewart, Kolasch & Birch, LLP

(57) ABSTRACT

Provided are a lens barrel and an imaging device, with which it is possible to lock an optical member of which the movement in an optical axis direction is made free in a case where there is no electrification, particularly to hold the optical member in a locked state without use of electric power. A movable frame that holds a focus lens is driven in the optical axis direction by a linear motor. In a case where the movable frame is to be locked with the linear motor being not electrified, the movable frame (engagement portion) is caused to abut onto a restriction portion at an end portion of the movable range of the movable frame and a locking ring is caused to rotationally move to a locking position by an electric actuator. Accordingly, the movable frame is fixed by the restriction portion and a locking portion of the locking ring to become unable to move. The electric actuator includes a worm gear as a power transmission mechanism and it is possible to hold the locking ring at the (Continued)

locking position by means of an irreversible rotation function of the worm gear.

20 Claims, 23 Drawing Sheets

(58) Field of Classification Search
USPC .......................................................... 359/823
See application file for complete search history.

(56) References Cited

U.S. PATENT DOCUMENTS

| 2007/0076539 | A1 | 4/2007 | Verberne et al. |
| 2015/0381858 | A1 | 12/2015 | Sterngren |
| 2018/0052298 | A1* | 2/2018 | Sueoka .................... G02B 7/04 |

FOREIGN PATENT DOCUMENTS

| JP | 2000-329993 A | 11/2000 |
| JP | 2001-222058 A | 8/2001 |
| JP | 2005-274631 A | 10/2005 |
| JP | 2008-164642 A | 7/2008 |
| JP | 2010-271607 A | 12/2010 |
| JP | 2015-148737 A | 8/2015 |
| JP | 2016-27376 A | 2/2016 |
| JP | 2017-3742 A | 1/2017 |

OTHER PUBLICATIONS

International Search Report (Form PCT/ISA/210) for International Application No. PCT/JP2018/043041, dated Jan. 15, 2019, with English translation.

Written Opinion of the International Searching Authority (Form PCT/ISA/237) for International Application No. PCT/JP2018/043041, dated Jan. 15, 2019.

Chinese Office Action and Search Report for corresponding Chinese Application No. 201880082003.0, dated Jul. 23, 2021, with an English translation.

* cited by examiner

LENS BARREL AND IMAGING DEVICE

CROSS-REFERENCE TO RELATED APPLICATIONS

The present application is a Continuation of PCT International Application No. PCT/JP2018/043041 filed on Nov. 21, 2018 claiming priorities under 35 U.S.C § 119(a) to Japanese Patent Application No. 2017-245042 filed on Dec. 21, 2017 and Japanese Patent Application No. 2018-109624 filed on Jun. 7, 2018. Each of the above applications is hereby expressly incorporated by reference, in its entirety, into the present application.

BACKGROUND OF THE INVENTION

1. Field of the Invention

The invention relates to a lens barrel and an imaging device, particularly to a technique of fixing an optical member in a case where the optical member such as a focus lens group in a lens barrel is made free due to the turning off of power or the like.

2. Description of the Related Art

An imaging device, in which a linear motor is used as an actuator that moves a focus lens group in a lens barrel in an optical axis direction, is known. In a case where such a type of imaging device is not in an imaging state (for example, at time of power-off or reproduction), a linear motor enters a non-electrification state and a focus lens group is made free.

There is a problem that the focus lens group is moved and collides with an end portion of the movable range of the focus lens group, the impact thereof is transmitted to a hand, and an impact noise is generated in a case where a user shakes the imaging device when the linear motor is in the non-electrification state. In addition, in a case where garbage is present in the lens barrel, there is a problem that the garbage is moved due to the impact and the garbage becomes apparent after shipment inspection.

In the related art, in order to solve the above-described problems, an optical device such as a camera, in which the movement of lens units in the optical device is limited by a limitation member in a case where linear motors that move the lens units are in a non-electrification state, has been proposed (JP2010-271607A).

In the optical device described in JP2010-271607A, with respect to a focus lens unit that moves in an optical axis direction and a image blur correction lens unit that moves in a direction different from the optical axis direction, a limitation member that is movable between a locking position at which the movement of those lens units is limited and an unlocking position at which the limitation is removed is provided and it is possible to move the limitation member between the locking position and the unlocking position by means of a drive force from a direct current motor.

Note that, the limitation member has a first limitation portion that limits the movement of the image blur correction lens unit and a second limitation portion that limits the movement of the focus lens unit by causing a portion of the focus lens unit to enter a space between the first limitation portion and the second limitation portion.

In addition, an imaging device described in JP2005-274631A comprises a retractable type lens barrel and the lens barrel has a first lens unit (focus lens or like) that is driven by a voice coil motor and a second lens unit (variator lens or like) that is driven by a zoom motor, which is a step motor. In a case where the lens barrel is to be retracted, the voice coil motor is caused to enter a non-electrification state, the second lens unit is moved in a retracting direction by the zoom motor, and the second lens unit is caused to abut onto the first lens unit so that the first lens unit is moved (retracted) simultaneously. The first lens unit in a retracted state is locked to become unable to move with the second lens unit abutting onto the first lens unit.

SUMMARY OF THE INVENTION

Regarding the optical device described in JP2010-271607A, in a case where the linear motor that drives the focus lens unit is in a non-electrification state, the limitation member is moved from the unlocking position to the locking position by means of a drive force from the direct current motor such that the focus lens unit is fixed by the limitation member at the locking position and the focus lens unit becomes unable to move. However, in a case where the direct current motor enters a non-electrification state, the focus lens unit locked by the limitation member may be released.

That is, the limitation member rotationally moves between the locking position and the unlocking position with a rotational driving force of the direct current motor transmitted via a speed reduction gear train and a locking shaft and in a case where the direct current motor enters a non-electrification state and the optical device is shaken such that a force is repeatedly applied to the limitation member from the focus lens unit, the limitation member may rotationally move little by little and the focus lens unit locked by the limitation member may be released.

Particularly, since the limitation member locks the focus lens unit by causing a claw portion of the focus lens unit to enter the space between the first limitation portion and the second limitation portion, there is a slight gap among the first limitation portion, the second limitation portion, and the claw portion and thus the focus lens unit is likely to move within the gap such that a force is applied to the limitation member. Furthermore, in JP2010-271607A, there is no description indicating that the limitation member is held at the locking position in a case where the direct current motor is in a non-electrification state.

Meanwhile, regarding the imaging device described in JP2005-274631A, the lens barrel is a retractable type and needs to comprise, in addition to a focus lens, a variator lens or like that is closer to a subject side than the focus lens and can abut onto the focus lens. Therefore there is a problem that there are a large number of restrictions on the lens barrel.

The present invention has been made in consideration of such circumstances and an object thereof is to provide a lens barrel and an imaging device, with which it is possible to lock an optical member of which the movement in an optical axis direction is made free in a case where there is no electrification, particularly to hold the optical member in a locked state without use of electric power.

In order to achieve the above-described object, a lens barrel according to an aspect of the present invention is a lens barrel comprising a fixed frame, a movable frame that holds an optical member and is supported by the fixed frame to be movable along an optical axis direction of the optical member, a linear motor that drives the movable frame in the optical axis direction of the optical member, a restriction portion that is provided on the fixed frame, abuts onto the movable frame at an end portion on one side of a movable range of the movable frame, and restricts movement of the movable frame, an engagement portion provided on the movable frame, a locking member that moves between a first position at which the locking member engages with the engagement portion of the movable frame and a second position at which the locking member is withdrawn from the engagement portion of the movable frame, the locking member fixing the movable frame between the restriction portion and the locking member in a case where the movable frame moves to a position at which the movable frame abuts onto the restriction portion and the locking member moves to the first position, an electric actuator that causes the locking member to move between the first position and the second position, and a holding mechanism that holds the locking member at the first position in a case where the electric actuator is turned off in a state where the movable frame is fixed by the locking member.

According to the aspect of the invention, the movable frame holding the optical member is driven in the optical axis direction of the optical member by the linear motor such as a voice coil motor but the movement thereof in the optical axis direction is made free in a state where no power is supplied to the linear motor. Therefore, in a state where the movable frame abuts onto the restriction portion at the end portion on the one side of the movable range of the movable frame, the locking member is caused to move to the first position (locking position) by the electric actuator such that the movable frame is fixed by the restriction portion and the locking member to become unable to move or caused to move to the second position (unlocking position) such that the movable frame becomes able to move. In addition, in a state where the locking member moves to the first position and the movable frame is fixed (locked state of optical member), the locking member is held at the first position by the holding mechanism. Accordingly, even in a case where the electric actuator is turned off, the locking member is prevented from moving from the first position by an external force that is applied via the movable frame in a case where a user shakes the imaging device. That is, the optical member is prevented from being unlocked by an impact or the like.

It is preferable that the lens barrel according to another aspect of the invention further comprises an abutting member that is provided on the fixed frame, is provided at least on a side opposite to the engagement portion of the movable frame with respect to the locking member having moved to the first position, and receives a force applied to the locking member from the movable frame via the engagement portion.

According to the other aspect of the invention, an external force applied via the movable frame can be received by the abutting member via the locking member and thus the locking member and the like can be prevented from being damaged.

In the lens barrel according to still another aspect of the invention, it is preferable that the optical member has a first optical member on an object side and a second optical member on an image formation side, the movable frame includes a first movable frame that holds the first optical member and is supported by the fixed frame to be movable along the optical axis direction and a second movable frame that holds the second optical member and is supported by the fixed frame to be movable along the optical axis direction, the linear motor includes a first linear motor that drives the first movable frame in the optical axis direction and a second linear motor that drives the second movable frame in the optical axis direction, the restriction portion includes a first restriction portion that abuts onto the first movable frame at an object side end portion of a movable range of the first movable frame and restricts movement of the first movable frame and a second restriction portion that abuts onto the second movable frame at an image formation side end portion of a movable range of the second movable frame and restricts movement of the second movable frame, the engagement portion includes a first engagement portion provided on the first movable frame and a second engagement portion provided on the second movable frame, and the locking member fixes the first movable frame and the second movable frame with the first movable frame and the second movable frame interposed between the first restriction portion and the second restriction portion in a case where the locking member is positioned at the first position and is withdrawn from the movable ranges of the first movable frame and the second movable frame such that the first movable frame and the second movable frame are unfixed in a case where the locking member is positioned at the second position.

According to the still other aspect of the invention, it is possible to fix the first movable frame and the second movable frame to become unable to move at the same time by moving one locking member to the first position or it is possible to unfix the first movable frame and the second movable frame at the same time by moving the one locking member to the second position.

In the lens barrel according to still another aspect of the invention, it is preferable that the locking member has a length corresponding to an interval between the first engagement portion and the second engagement portion that is formed when the first movable frame and the second movable frame abut onto the first restriction portion and the second restriction portion respectively and the locking member is inserted into a space between the first engagement portion and the second engagement portion or withdrawn from the space between the first engagement portion and the second engagement portion.

According to the still other aspect of the invention, it is possible to fix the first movable frame and the second movable frame at the same time by inserting the locking member having the length corresponding to the interval between the first engagement portion and the second engagement portion into the space between the first engagement portion and the second engagement portion (between first movable frame and second movable frame) in a state where the first movable frame and the second movable frame abut onto the first restriction portion and the second restriction portion respectively.

In the lens barrel according to still another aspect of the invention, it is preferable that the locking member has a first rack portion that is supported to be movable along an optical axis of the optical member and of which teeth are linearly arranged along the optical axis, a second rack portion that is supported to be movable along the optical axis and of which teeth are linearly arranged along the optical axis, and a pinion gear that is disposed between the first rack portion and the second rack portion and is rotated by a rotational driving force from an electric actuator such that the first rack portion and the second rack portion move in opposite directions.

According to the still other aspect of the invention, it is possible to fix the first movable frame and the second movable frame at the same time in a state of abutting onto the first restriction portion and the second restriction portion respectively or to unfix the first movable frame and the second movable frame by causing the first rack portion and the second rack portion to move in the opposite directions by means of the locking member composed of a rack and pinion mechanism.

In the lens barrel according to still another aspect of the invention, it is preferable that the locking member is supported to be rotationally movable around an optical axis of the optical member or rotationally movable around a rotation axis that is different from the optical axis of the optical member and is parallel to the optical axis, the electric actuator is composed of an electric motor and a power transmission mechanism that transmits a rotational driving force of the electric motor to the locking member and causes the locking member to rotationally move between the first position and the second position, and the holding mechanism is a worm gear incorporated into the power transmission mechanism.

According to the still other aspect of the invention, the worm gear is incorporated into the power transmission mechanism that transmits the rotational driving force of the electric motor to the locking member and thus it is possible to hold the locking member at the first position by means of an irreversible rotation function of the worm gear when the electric motor is not electrified. In addition, the power transmission mechanism can be made compact since a large reduction gear ratio can be achieved by means of the worm gear.

In the lens barrel according to still another aspect of the invention, it is preferable that a lead angle of the worm gear is equal to or smaller than 20 degrees. Accordingly, the irreversible rotation function of the worm gear can be exhibited.

In the lens barrel according to still another aspect of the invention, it is preferable that a worm of the worm gear is fixed to a rotation shaft of the electric motor, and an interval between an end surface of the worm that is on the electric motor side and an end surface of a bearing portion of the electric motor that is on the worm side is narrower than a movable range of the rotation shaft of the electric motor in an axial direction.

According to the still other aspect of the invention, in a case where a force in the axial direction and a rotational force are applied to the rotation shaft of the electric motor from the worm gear with the electric motor being not electrified, the end surface of the worm that is on the electric motor side and the end surface of the bearing portion of the electric motor that is on the worm side come into contact with each other. A frictional force at a contact surface between the end surfaces is increased by the force in the axial direction that is applied from the worm gear and acts as a force inhibiting rotation (that is, movement of locking member) of the worm gear. Accordingly, it is not necessary to make the lead angle of the worm gear small and the risk of the biting of the worm gear (locking between worm and worm wheel) can also be reduced.

In the lens barrel according to still another aspect of the invention, it is preferable that the holding mechanism is an elastic member that elastically holds the restriction portion in the optical axis direction of the optical member, and, in a case where the linear motor causes the movable frame to abut onto the restriction portion and the elastic member is compressed, the locking member is movable by the electric actuator to the first position at which the locking member engages with the engagement portion. Therefore, in a case where the linear motor is caused to enter a non-electrification state after the locking member is moved to the first position, the movable frame is pressed against the locking member by the elastic member. Since a frictional force against the movement of the locking member is generated because of a pressing force, the locking member can be held at the first position even in a case where the electric actuator enters a non-electrification state.

In the lens barrel according to still another aspect of the invention, it is preferable that the locking member is supported to be rotationally movable around an axis that is different from the optical axis of the optical member and is parallel to the optical axis, the electric actuator is an electric motor that causes the locking member to rotationally move between the first position and the second position, the holding mechanism includes an elastic member that elastically holds the restriction portion in the optical axis direction of the optical member and the engagement portion in which a recess portion that inhibits rotational movement of the locking member in a case where the locking member engages with the recess portion is formed, and, in a case where the linear motor causes the movable frame to abut onto the restriction portion and the elastic member is compressed, the locking member is rotationally movable by the electric motor to the first position at which the locking member engages with the recess portion of the engagement portion. Therefore, in a case where the linear motor is caused to enter a non-electrification state after the locking member is moved to the first position, the movable frame is pressed against the locking member by the elastic member and the recess portion of the engagement portion engages with the locking member. Since the recess portion of the engagement portion and the locking member engage with each other, the locking member is prevented from falling out from the engagement portion (recess portion thereof) even in a case where the electric actuator enters a non-electrification state and thus the locking member can be held at the first position.

In the lens barrel according to still another aspect of the invention, it is preferable that the locking member is supported to be rotationally movable around an axis that is different from the optical axis of the optical member and is parallel to the optical axis, the electric actuator is an electric motor that causes the locking member to rotationally move between the first position and the second position, and the holding mechanism is a spring member that becomes resistance against rotational movement of the locking member in a direction toward the second position in a case where the locking member rotationally moves to the first position. In a case where the locking member rotationally moves to the first position, the spring member becomes resistance against the rotational movement of the locking member in the direction toward the second position. Accordingly, the locking member can be held at the first position.

In the lens barrel according to still another aspect of the invention, it is preferable that the spring member is a tension spring that is disposed between the locking member and the fixed frame, the first position and the second position of the locking member are positioned on opposite sides with a neutral position, at which the tension spring expands most, interposed therebetween, the tension spring urges the locking member in a direction toward the first position in a case where the locking member rotationally moves in the direction toward the first position beyond the neutral position, and the tension spring urges the locking member in a direction toward the second position in a case where the locking member rotationally moves in the direction toward the second position beyond the neutral position.

The tension spring urges the locking member in the direction toward the first position in a case where the locking member rotationally moves in the direction toward the first position beyond the neutral position at which the tension spring expands most. Meanwhile, the tension spring urges the locking member in a direction toward the second position in a case where the locking member rotationally moves in the direction toward the second position beyond the neutral position at which the tension spring expands most. That is, the urging direction of the tension spring changes depending on the rotational movement position of the locking member and thus the tension spring becomes resistance in a case where the locking member rotationally moves from the first position or the second position in an opposite direction and the tension spring returns the locking member to the original position even in a case where the locking member rotationally moves slightly.

It is preferable that the lens barrel according to still another aspect of the invention further comprises a first stopper and a second stopper that restrict a rotational movement range of the locking member against an urging force by the tension spring.

It is preferable that the lens barrel according to still another aspect of the invention further comprises a first gear that is provided on a shaft of the electric motor and a second gear that is provided to be coaxial with the axis of the locking member and to which a rotational driving force is transmitted from the electric motor via at least the first gear, and one end of the tension spring is fixed to the fixed frame and the other end of the tension spring is fixed to a pin embedded in the second gear.

In the lens barrel according to still another aspect of the invention, it is preferable that the pin abuts onto the first stopper in a case where the locking member rotationally moves to the first position and the pin abuts onto the second stopper in a case where the locking member rotationally moves to the second position.

In the lens barrel according to still another aspect of the invention, it is preferable that the pin and the first stopper abut onto each other via an elastic body and the pin and the second stopper abut onto each other via the elastic body. Accordingly, a collision sound generated in a case where the pin abuts onto the first stopper or the second stopper can be reduced.

In the lens barrel according to still another aspect of the invention, it is preferable that the elastic body is an O-ring mounted onto the pin.

In the lens barrel according to still another aspect of the invention, it is preferable that a first shock absorbing material is disposed on at least one of the restriction portion or an abutting portion of the movable frame that abuts onto the restriction portion and a second shock absorbing material is disposed on at least one of the engagement portion of the movable frame or the locking member. Accordingly, generation of a collision sound is suppressed and an impact is alleviated in a case where the optical member is locked or in a locked state.

In the lens barrel according to still another aspect of the invention, it is preferable that the optical member is a focus lens.

In the lens barrel according to still another aspect of the invention, it is preferable that the linear motor is a voice coil motor.

It is preferable that the lens barrel according to still another aspect of the invention further comprises a position detection unit that detects whether or not the locking member is held at the first position.

It is preferable that an imaging device according to still another aspect of the invention comprises the above-described lens barrel.

In the imaging device according to still another aspect of the invention, it is preferable that the lens barrel is an interchangeable lens.

It is preferable that the imaging device according to still another aspect of the invention further comprises an instruction input reception unit that receives an instruction to cause the imaging device to enter an image-capturable state or an image-uncapturable state, a linear motor control unit that drives the linear motor such that the movable frame is moved to a position at which the movable frame abuts onto the restriction portion in a case where the instruction input reception unit receives an instruction to cause the imaging device to enter the image-uncapturable state, an electric actuator control unit that drives the electric actuator such that the locking member is moved from the second position to the first position in a case where the movable frame moves to the position at which the movable frame abuts onto the restriction portion, and a power source control unit that turns off a power source driving at least the linear motor and the electric actuator in a case where the locking member is moved to the first position.

According to the still other aspect of the invention, in a case where the imaging device is not in an imaging state (for example, at time of power-off or reproduction), the linear motor or the like driving the optical member is caused to enter a non-electrification state. However, in a case where the instruction to cause the imaging device to enter the image-uncapturable state is received before the linear motor enters the non-electrification state, the linear motor is driven and the movable frame is moved to the position at which the movable frame abuts onto the restriction portion. Thereafter, the electric actuator is driven such that the locking member is moved from the second position to the first position and in a case where the locking member moves to the first position, the power source driving at least the linear motor and the electric actuator is turned off. Accordingly, it is possible to hold the optical member in a locked state without power consumption.

In the imaging device according to still another aspect of the invention, it is preferable that the power source control unit turns on the power source driving at least the linear motor and the electric actuator in a case where the instruction input reception unit receives an instruction to cause the imaging device to enter the image-capturable state and the electric actuator control unit drives the electric actuator such that the locking member is moved from the first position to the second position in a case where the instruction input reception unit receives an instruction to cause the imaging device to enter the image-capturable state and the power source driving the electric actuator is turned on. Accordingly, it is possible to unlock the optical member and cause the imaging device to enter the image-capturable state.

According to the present invention, it is possible to lock an optical member of which the movement in an optical axis direction is made free in a lens barrel in a case where there is no electrification, particularly to hold the optical member in a locked state by means of a holding mechanism without use of electric power.

DESCRIPTION OF THE PREFERRED EMBODIMENTS

Hereinafter, preferred embodiments of a lens barrel and an imaging device according to an embodiment of the present invention will be described with reference to the accompanying drawings.

First Embodiment

Figure 1:
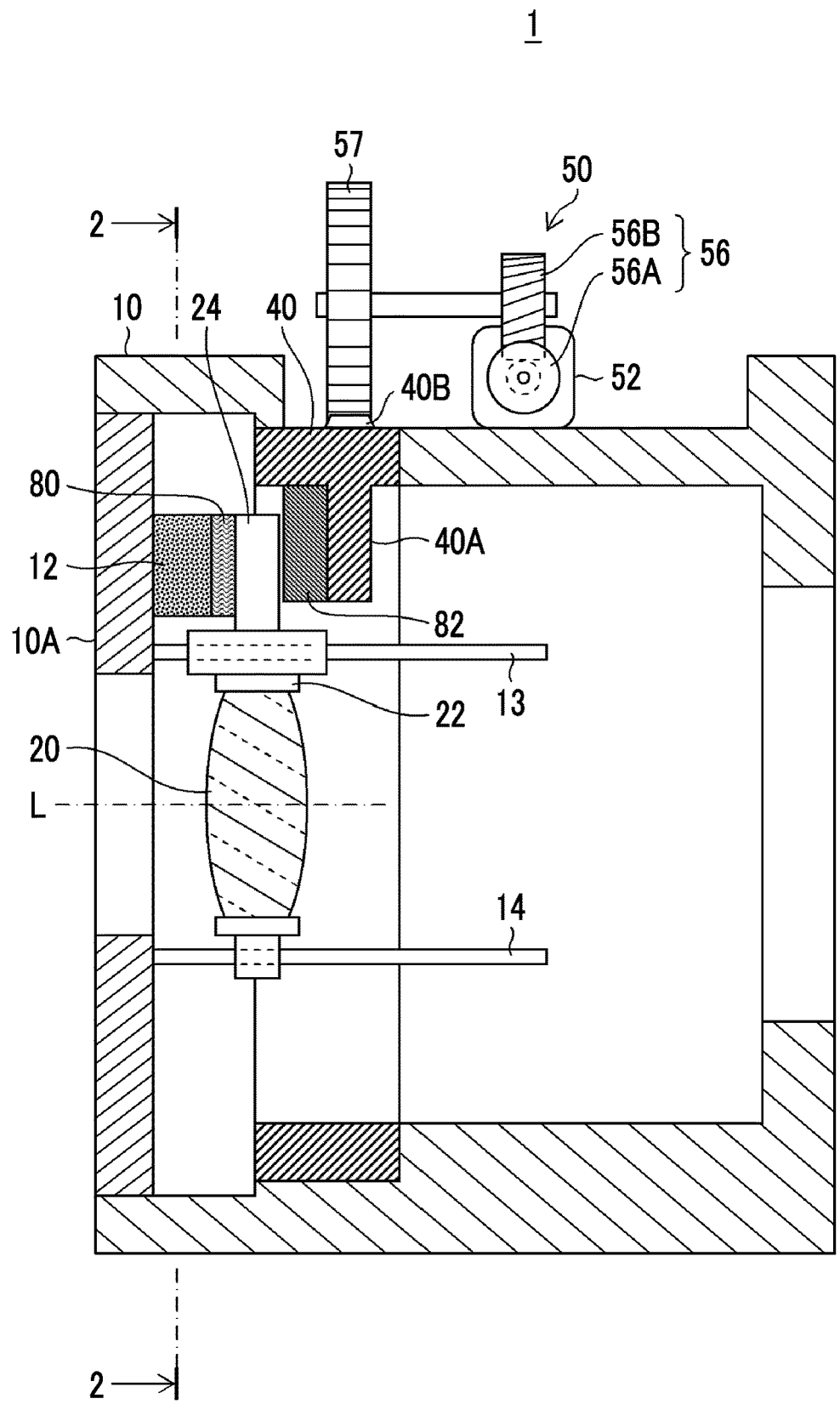
FIG. 1 is a main part sectional view showing a first embodiment of a lens barrel according to an embodiment of the present invention.
Figure 2:
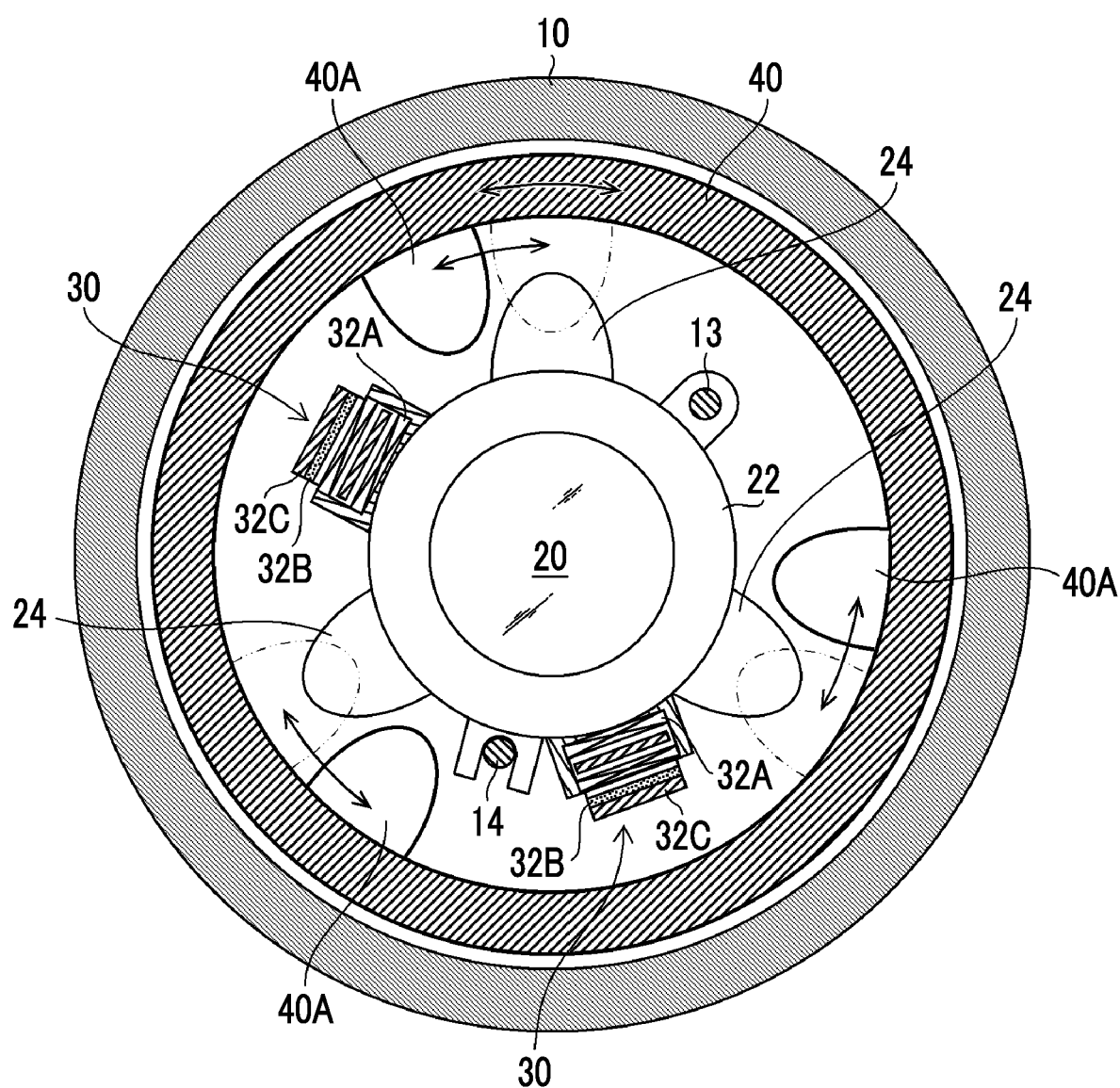
FIG. 2 is a sectional view taken along line 2-2 shown in FIG. 1.

FIG. 1 is a main part sectional view showing a first embodiment of a lens barrel according to an embodiment of the present invention, and FIG. 2 is a sectional view taken along line 2-2 shown in FIG. 1.

In the present example, a lens barrel 1 shown in FIGS. 1 and 2 functions as a single-focus interchangeable lens of a lens interchangeable camera having an auto focus (AF) function.

The lens barrel 1 is mainly composed of a fixed frame 10, a movable frame 22 that holds an optical member (focus lens) 20, voice coil motors (VCMs) 30 each of which is a type of a linear motor driving the movable frame 22, a restriction portion 12 that restricts the movement of the movable frame 22, engagement portions 24 that are provided on the movable frame 22, a locking ring 40 that functions as a locking member fixing (locking) the movement of the movable frame 22, and an electric actuator 50 that causes the locking ring 40 to move (rotationally move).

To the fixed frame 10, a main shaft 13 and a sub shaft 14 are fixed. In the present example, object side end portions of the main shaft 13 and the sub shaft 14 are fixed to a supporting member 10A fixed to the fixed frame 10. That is, the main shaft 13 and the sub shaft 14 are directly fixed to the fixed frame 10 or are indirectly fixed to the fixed frame 10 via the supporting member 10A.

The movable frame 22 that holds the focus lens 20 is guided by the main shaft 13 and the sub shaft 14 and is supported by the fixed frame 10 to be movable along an optical axis direction of the focus lens 20 (direction along optical axis L). Accordingly, the focus lens 20 is disposed to be movable with respect to the fixed frame 10 in the optical axis direction by means of the movable frame 22, the main shaft 13, and the sub shaft 14.

As shown in FIG. 2, two sets of VCMs 30 in the present example are provided for the movable frame 22. The VCM 30 is a moving coil type VCM 30 in which a coil portion 32A of the VCM 30 is disposed on the movable frame 22 side and a yoke 32C comprising a magnet 32B is disposed on the fixed frame 10 side (not shown).

The VCM 30 is suitable as an actuator for the focus lens 20 because a smooth operation can be achieved and the resolution is high. However, since the VCM 30 has no position holding ability in a non-electrification state, the movement of the focus lens 20 is made free.

In addition, the movable frame 22 is provided with three engagement portions (projecting portions) 24 disposed at equal intervals (FIG. 2).

The restriction portion 12 that restricts the movement of the movable frame 22 is disposed on the fixed frame 10 side (in present example, supporting member 10A fixed to fixed frame 10). In a case where the movable frame 22 moves to an end portion on one side (in present example, end portion on object side) of a movable range, the restriction portion 12 abuts onto the movable frame 22 (in present example, engagement portions 24 that function as abutting portions also) and restricts the movement of the movable frame 22.

As shown in FIG. 1, the restriction portion 12 is provided with a first shock absorbing material 80 and the restriction portion 12 abuts onto the engagement portions 24 of the movable frame 22 via the first shock absorbing material 80. However, the restriction portion 12 may abut onto a portion of the movable frame 22 other than the engagement portions 24. In addition, although the first shock absorbing material 80 is not essential, it is preferable that the first shock absorbing material 80 is provided so that a collision sound generated at the time of collision of the movable frame 22 is suppressed and an impact is alleviated. Furthermore, the first shock absorbing material 80 may not be provided on the restriction portion 12. The first shock absorbing material 80 may be provided on the movable frame 22 that abuts onto the restriction portion 12 or provided on both of the restriction portion 12 and the movable frame 22.

The locking ring 40 that functions as a locking member fixing (locking) the movement of the movable frame 22 is supported with respect to the fixed frame 10 to be rotationally movable around the optical axis L of the focus lens 20 and has three locking portions 40A (FIG. 2) that protrude from an inner side of the locking ring 40 to correspond to the three engagement portions 24 of the movable frame 22. Note that, although the three locking portions 40A of the locking ring 40 shown in FIG. 2 are at second positions (unlocking positions) at which the three locking portions 40A are withdrawn from the three engagement portions 24 of the movable frame 22, in a case where the locking portions 40A rotationally moves in a clockwise direction in FIG. 2 and move to first positions (locking positions) represented by two-dot chain lines, the locking portions 40A engage with the engagement portions 24.

As shown in FIG. 1, second shock absorbing materials 82 are provided on the locking portions 40A of the locking ring 40 and the locking portions 40A can abut onto the engagement portions 24 of the movable frame 22 via the second shock absorbing materials 82. Although the second shock absorbing materials 82 are not essential, it is preferable that the second shock absorbing materials 82 are provided so that a collision sound is restrained from being generated and an impact is alleviated. Furthermore, the second shock absorbing materials 82 may not be provided on the locking portions 40A. The second shock absorbing materials 82 may be provided on the engagement portions 24 of the movable frame 22 or provided on both of the locking portions 40A and the engagement portions 24.

A gear 40B is provided on a portion of an outer circumference of the locking ring 40 and the locking ring 40 is moved (rotationally moved) to a locking position or an unlocking position by means of a rotational driving force transmitted from the electric actuator 50 via the gear 40B.

[Electric Actuator]

First Embodiment of Electric Actuator

Next, a first embodiment of the electric actuator 50 that causes the locking ring 40 to rotationally move between the locking position and the unlocking position will be described.

The electric actuator 50 has an electric motor 52 and a power transmission mechanism that transmits a rotational driving force of the electric motor 52 to the locking ring 40 and a worm gear 56 is incorporated into the power transmission mechanism.

A worm 56A of the worm gear 56 is fixed to a rotation shaft of the electric motor 52 and a spur gear 57 is provided to be coaxial with a worm wheel 56B that meshes with the worm 56A. The spur gear 57 meshes with the gear 40B provided around the locking ring 40.

Therefore, in a case where the electric motor 52 is driven, a rotational driving force thereof is transmitted to the locking ring 40 via the worm gear 56 (worm 56A, worm wheel 56B), the spur gear 57, and the gear 40B such that the locking ring 40 is caused to rotationally move between the locking position and the unlocking position.

By means of an irreversible rotation function of the worm gear 56, the power transmission mechanism including the worm gear 56 can hold the locking ring 40 at the locking position or the like even in a case where the electric motor 52 is in a non-electrification state. For example, even in a case where the lens barrel 1 is shaken and an external force is repeatedly applied to the locking ring 40 via the movable frame 22 (focus lens 20), the locking ring 40 can be held at the locking position.

In addition, the power transmission mechanism including the worm gear 56 can be made compact since a large reduction gear ratio can be achieved by means of the worm gear 56.

Figure 3:
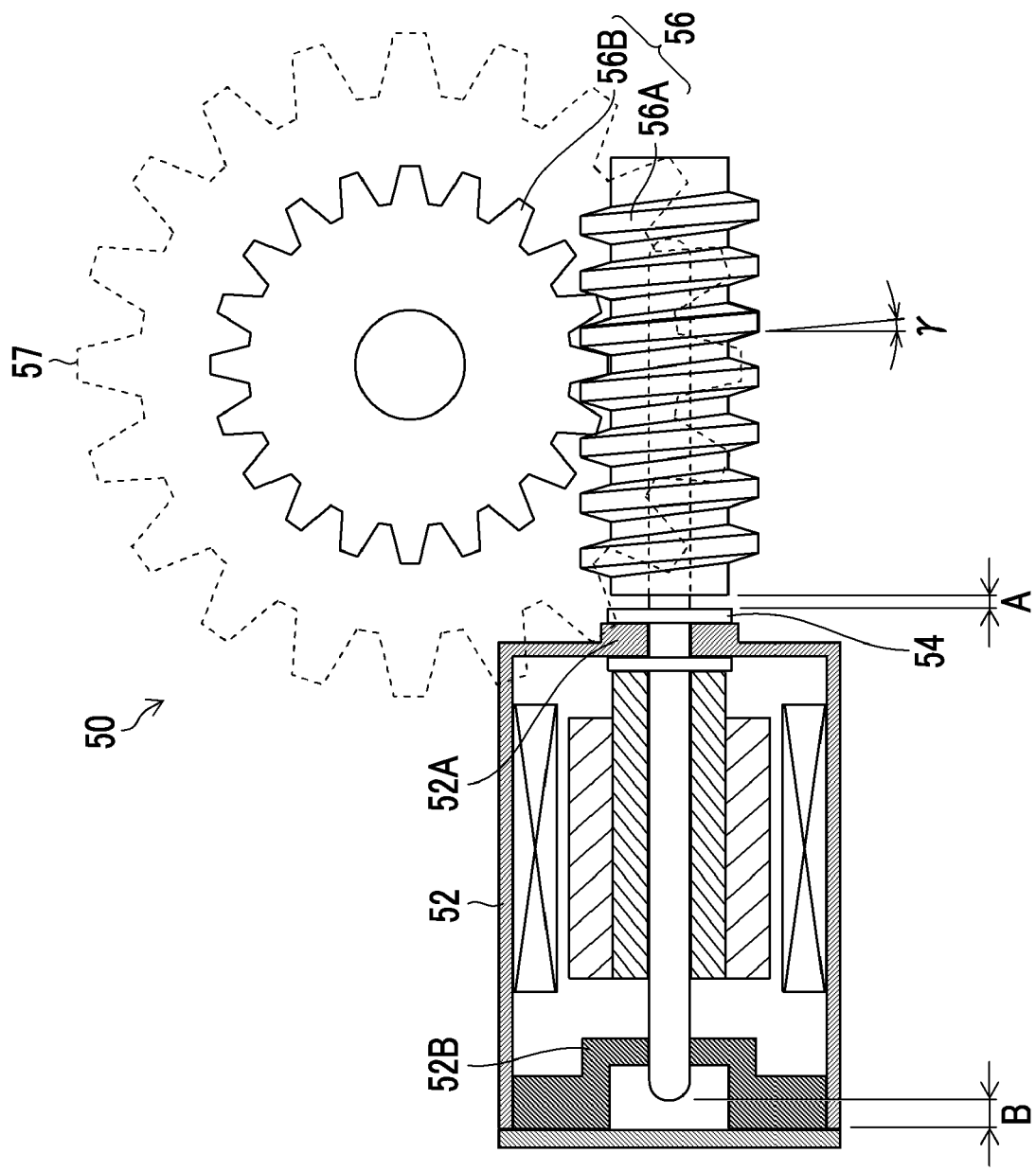
FIG. 3 is a view showing an electric actuator according to the first embodiment in detail.

FIG. 3 is a view showing the electric actuator 50 according to the first embodiment in detail.

As shown in FIG. 3, the rotation shaft of the electric motor 52 is pivotally supported by bearing portions 52A and 52B.

The worm 56A is fixed to the rotation shaft of the electric motor 52 and the worm wheel 56B meshes with the worm 56A. A washer 54 is provided on the rotation shaft between the electric motor 52 and the worm 56A. Note that, the washer 54 can be omitted.

As the worm gear 56 in the present example, a worm gear having a lead angle γ of 20 degrees or less is used. Since the worm gear 56 of which the lead angle γ is 20 degrees or less is used, the irreversible rotation function of the worm gear can be more effectively exhibited.

In a case where an interval between an end surface of the worm 56A that is on the electric motor 52 side and an end surface (in present example, end surface of washer 54) of the bearing portion 52A of the electric motor 52 that is on the worm 56A side is A and the movable range of the rotation shaft of the electric motor 52 in an axial direction is B, a relationship of A<B is satisfied.

Since the interval A is made narrower than the movable range B (A<B), in a case where an external force is applied via the locking ring 40 in such a direction that the worm gear 56 is rotated reversely, a force in the axial direction is applied to the rotation shaft of the electric motor 52 via the worm 56A. Due to the force in the axial direction, the rotation shaft of the electric motor 52 moves in the axial direction, the end surface of the worm 56A comes into contact with the end surface (end surface of washer 54) of the bearing portion 52A of the electric motor 52, and a frictional force is generated at a contact surface between the end surfaces. The frictional force is increased by a force in the axial direction that is applied from the worm gear 56 and acts as a force inhibiting rotation (that is, rotation of locking ring 40) of the worm gear 56.

Accordingly, it is not necessary to make the lead angle γ of the worm gear 56 small and the risk of biting of the worm gear 56 (locking between worm 56A and worm wheel 56B) can also be reduced.

In addition, it is preferable that the end surfaces that come into contact with each other each have a large friction coefficient or are processed to have a large friction coefficient.

[Imaging Device]

Figure 4:
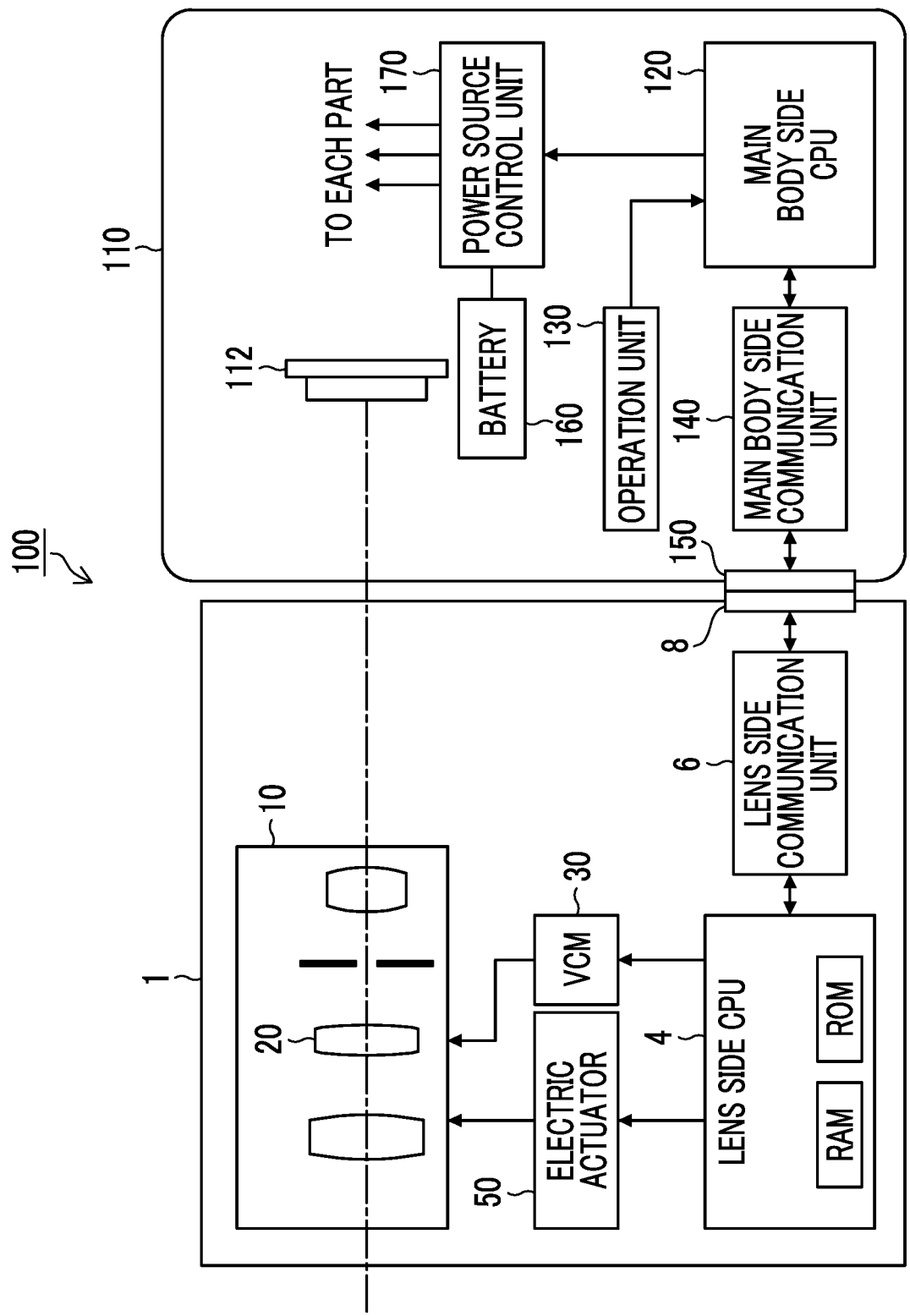
FIG. 4 is a diagram illustrating an embodiment of an imaging device that comprises the lens barrel and is a block diagram mainly showing an electrical internal configuration of the imaging device.

FIG. 4 is a diagram illustrating an embodiment of the imaging device 100 that comprises the lens barrel 1 and is a block diagram mainly showing an electrical internal configuration of the imaging device 100.

The lens barrel 1 comprises a lens side central processing unit (CPU) 4, a lens side communication unit 6, and a lens mount 8 in addition to the fixed frame 10 comprising optical members such as the focus lens 20 and a stop, the VCMs 30, and the electric actuator 50.

The lens side CPU 4 comprehensively controls the lens barrel 1 and a read only memory (ROM) and a random access memory (RAM) are built thereinto.

The lens side CPU 4 comprehensively controls each part of the lens barrel 1 by using the RAM as a work area, in accordance with a control program stored in the ROM.

The lens side communication unit 6 communicates with a camera main body 110 via a plurality of terminals provided for the lens mount 8 in a state where the lens mount 8 is mounted on a main body mount 150 of the camera main body 110. That is, the lens side communication unit 6 transmits and receives (bidirectional communication) a request signal and a response signal to and from a main body side communication unit 140 of the camera main body 110, which is connected via the lens mount 8 and the main body mount 150, in accordance with an order from the lens side CPU 4 to notify the camera main body 110 of lens information (focus position information of focus lens 20, stop information, or like) of each optical member in the fixed frame 10.

In addition, the lens side communication unit 6 transmits and receives a request signal and a response signal for locking or unlocking the focus lens 20. Furthermore, to the lens barrel 1, driving power is supplied from the camera main body 110 via the lens mount 8.

In a case where a request signal for locking the focus lens 20 is received from the camera main body 110, the lens side CPU 4 controls each part in accordance with the control program stored in the ROM and locks the focus lens 20 in accordance with the following procedure.

In a case where the lens side CPU 4 functioning as a linear motor control unit receives an instruction (request signal for locking focus lens 20) to cause the imaging device 100 to enter an image-uncapturable state from the camera main body 110, first, the lens side CPU 4 drives the VCMs 30 such that the movable frame 22 is moved to a position (position shown in FIG. 1) at which the movable frame 22 abuts onto the restriction portion 12.

In a case where the movable frame 22 moves to a position at which the movable frame 22 abuts onto the restriction portion 12 (in present example, first shock absorbing material 80), the lens side CPU 4 functioning as an electric actuator control unit drives the electric actuator 50 (electric motor 52) such that the locking ring 40 rotationally moves to the locking position from the unlocking position (position shown in FIG. 2).

Accordingly, as shown in FIG. 1, the engagement portions 24 of the movable frame 22 are interposed between the restriction portion 12 (first shock absorbing material 80 thereof) and the locking portions 40A (second shock absorbing material 82 thereof) of the locking ring 40 and the movable frame 22 is fixed (locked) to become unable to move.

In a case where the movable frame 22 (focus lens 20) is locked by the locking ring 40 in this manner, the lens side CPU 4 functioning as a power source control unit turns off a power source driving at least the VCMs 30 and the electric motor 52 (stops supply of power).

Because of the irreversible rotation function that the worm gear 56 has as described in FIG. 3, the locking ring 40 can be held at the locking position even in a case where the VCMs 30 and the electric motor 52 enter a non-electrification state.

Meanwhile, in a case where the lens side CPU 4 receives an instruction (request signal for unlocking focus lens 20) to cause the imaging device 100 to enter an image-capturable state from the camera main body 110, first, the lens side CPU 4 drives the electric motor 52 such that the locking ring 40 rotationally moves to the unlocking position from the locking position and the movable frame 22 is unlocked.

After the movable frame 22 is unlocked, the lens side CPU 4 drives the VCMs 30 based on an order from the camera main body 110 such that the movable frame 22 (focus lens 20) is moved to a desired position.

The camera main body 110 comprises an image sensor 112, a main body side CPU 120, an operation unit 130, the main body side communication unit 140, the main body mount 150, a power source control unit 170, a battery 160, and the like. Note that, although the camera main body 110 further comprises a digital signal processing section that processes image data obtained from the image sensor 112, a compression/expansion processing section, a recording control unit, a display unit, and the like, those are not shown in FIG. 4.

The operation unit 130 includes a power switch, a shutter release switch, and a switch or a dial for selecting various modes such as an imaging mode and a playback mode.

The main body side CPU 120 comprehensively controls each part of the camera main body 110 based on an operation input from the operation unit 130.

The main body side communication unit 140 transmits and receives (bidirectional communication) a request signal and a response signal to and from the lens side communication unit 6 of the lens barrel 1, which is connected via the main body mount 150 and the lens mount 8, in accordance with an order from the main body side CPU 120. Note that, the main body mount 150 is provided with a plurality of terminals and in a case where the lens barrel 1 is mounted onto the camera main body 110 (lens mount 8 and main body mount 150 are connected to each other), the plurality of terminals provided on the main body mount 150 and the plurality of terminals provided on the lens mount 8 are electrically connected to each other such that bidirectional communication between the main body side communication unit 140 and the lens side communication unit 6 becomes possible.

In accordance with an order from the main body side CPU 120, the power source control unit 170 applies a power-supply voltage supplied from the battery 160 to each part of the camera main body 110 and to each part of the lens barrel 1 via the main body mount 150 and the lens mount 8. Note that, in accordance with an order from the main body side CPU 120, the power source control unit 170 switches on and off the power supply voltage applied to the lens barrel 1 via the main body mount 150 and the lens mount 8.

In a case where the camera main body 110 receives an instruction to cause the imaging device 100 to enter an image-capturable state (for example, instruction to turn on power switch of operation unit 130 in imaging mode or to switch mode from playback mode to imaging mode) from the operation unit 130 functioning as an instruction input reception unit, the camera main body 110 transmits a request signal for unlocking the focus lens 20 to the lens side CPU 4 via the main body side communication unit 140, the main body mount 150, the lens mount 8, and the lens side communication unit 6.

In addition, in a case where the camera main body 110 receives an instruction to cause the imaging device 100 to enter an image-uncapturable state (for example, instruction to turn off power switch of operation unit 130 or switch mode from imaging mode to playback mode) from the operation unit 130, the camera main body 110 transmits a request signal for locking the focus lens 20 to the lens side CPU 4 via the main body side communication unit 140, the main body mount 150, the lens mount 8, and the lens side communication unit 6.

The lens barrel 1 (lens side CPU 4) controls each part in accordance with the control program stored in the ROM and performs an operation of causing the focus lens 20 to enter an unlocked state in a case where a request signal for unlocking the focus lens 20 is received from the camera main body 110 and performs an operation of causing the focus lens 20 to enter a locked state in a case where a request signal for locking the focus lens 20 is received from the camera main body 110.

Note that, it is a matter of course that the camera main body 110 cuts off power supply to the lens barrel 1 after receiving a response signal indicating the focus lens 20 has entered an unlocked state from the lens barrel 1 in a case where the power switch is turned off.

Second Embodiment

Figure 5:
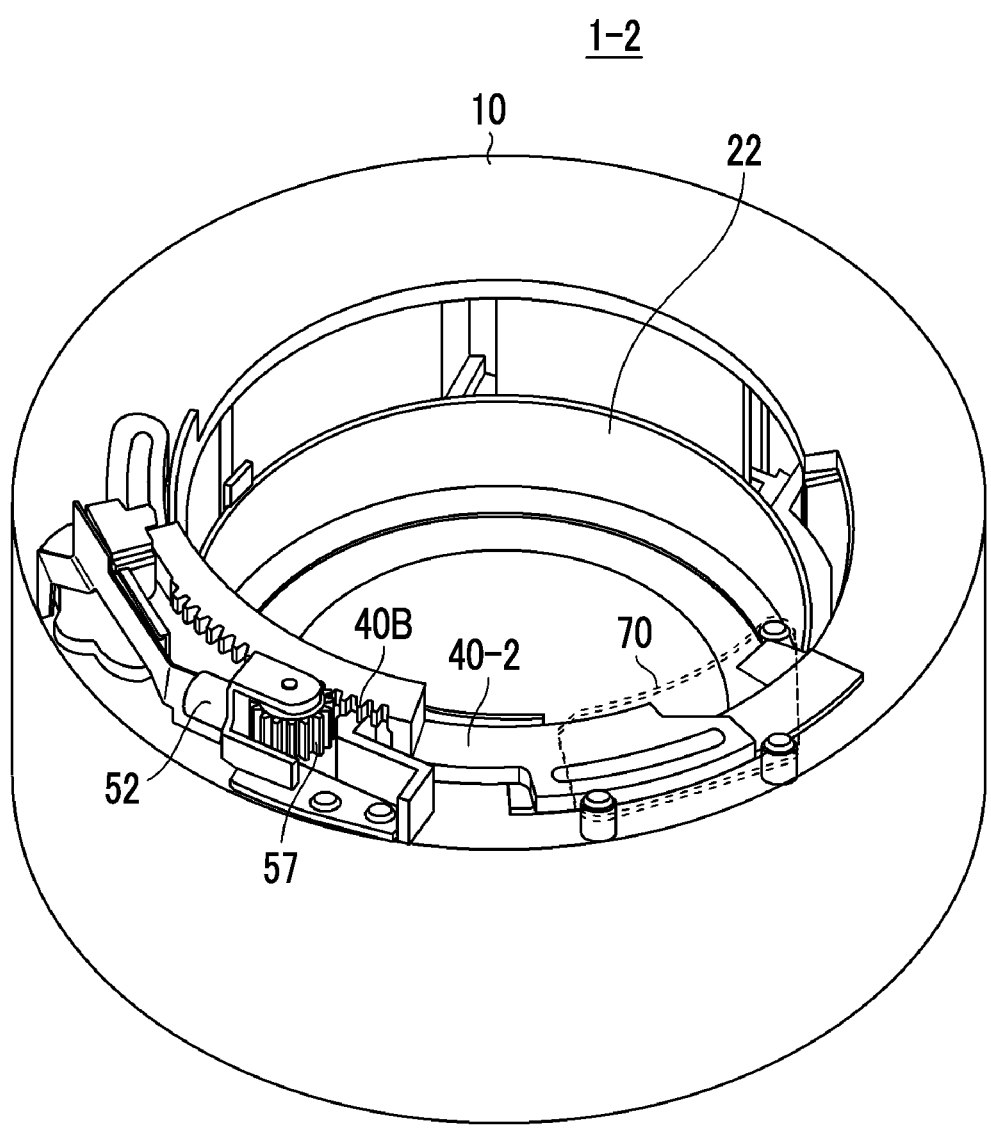
FIG. 5 is a perspective view showing a second embodiment of the lens barrel according to an embodiment of the present invention.

FIG. 5 is a perspective view showing a second embodiment of the lens barrel according to the embodiment of the present invention. Note that, the same parts as those in the lens barrel 1 in the first embodiment shown in FIGS. 1 and 2 are given the same reference numerals and detailed description thereof will be omitted.

A lens barrel 1-2 of the second embodiment shown in FIG. 5 is different from that in the first embodiment mainly in a point that a locking member 40-2 is used instead of the locking ring 40 and an abutting member 70 is added.

Although the locking member 40-2 is supported with respect to the fixed frame 10 to be rotationally movable around the optical axis L of the focus lens 20 similarly to the locking ring 40, the locking member 40-2 is not formed in a ring shape and is formed in an arc shape.

Figure 6:
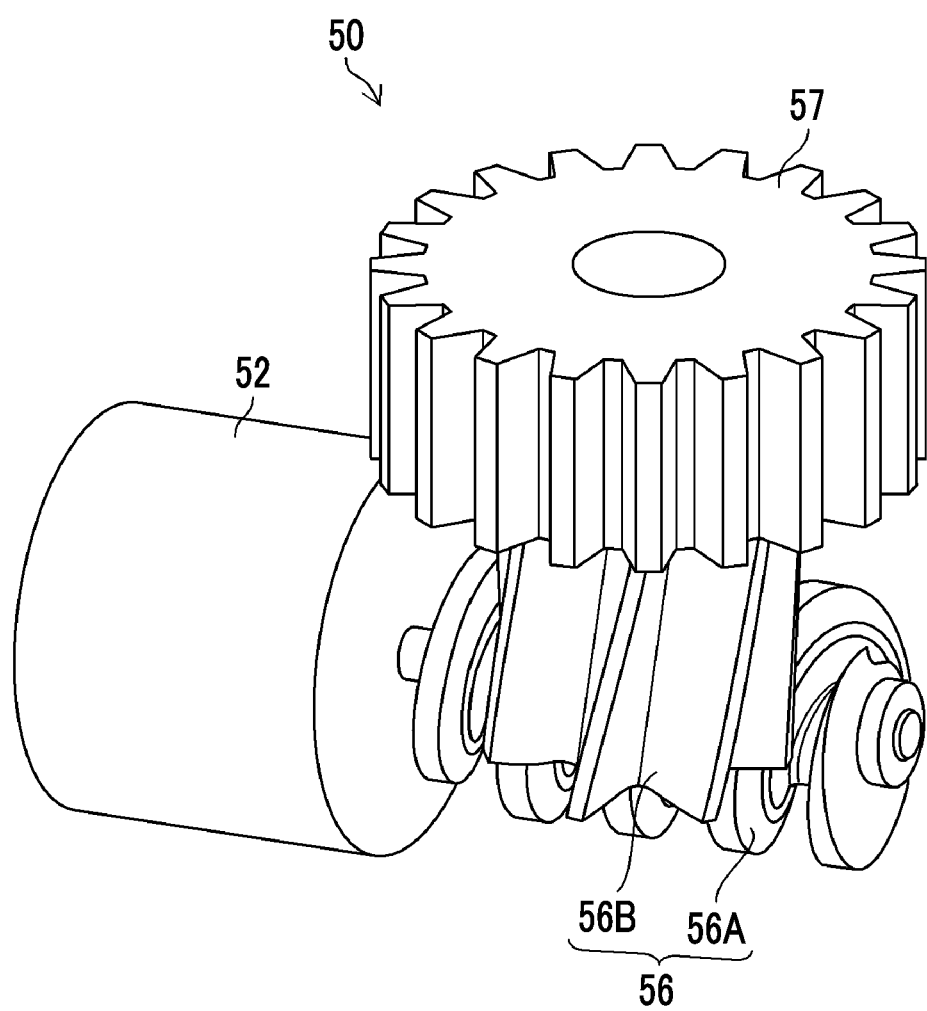
FIG. 6 is a perspective view of the electric actuator applied to the lens barrel of the second embodiment.

FIG. 6 is a perspective view of the electric actuator 50 applied to the lens barrel 1-2 of the second embodiment.

The spur gear 57 of a gear train of the electric actuator 50 shown in FIG. 6 meshes with the gear 40B formed on the locking member 40-2. Therefore, in a case where the electric motor 52 is driven, the rotational driving force thereof is transmitted to the locking member 40-2 via the worm gear 56, the spur gear 57, and the gear 40B such that the locking member 40-2 rotationally moves between a locking position and an unlocking position.

Figure 7:
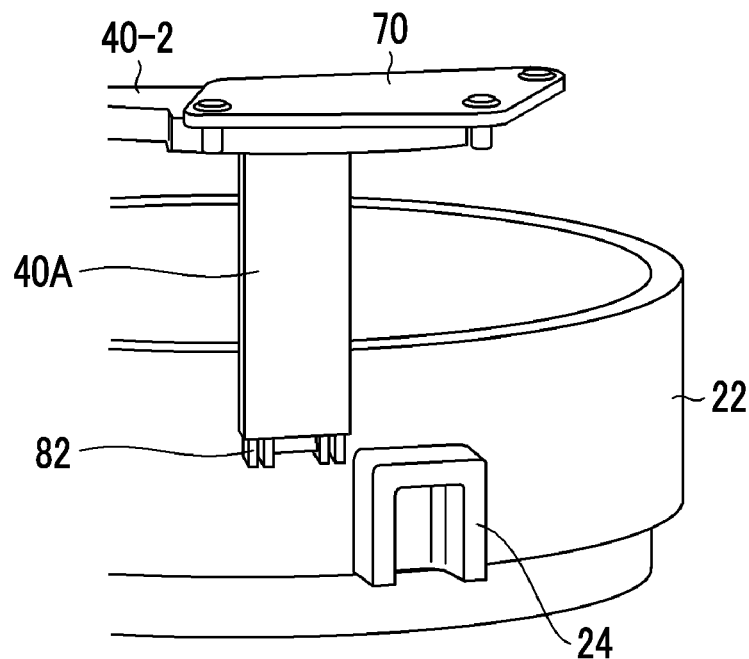
FIG. 7 is a main part perspective view of the lens barrel according to the second embodiment and a view showing an unlocked state.
Figure 8:
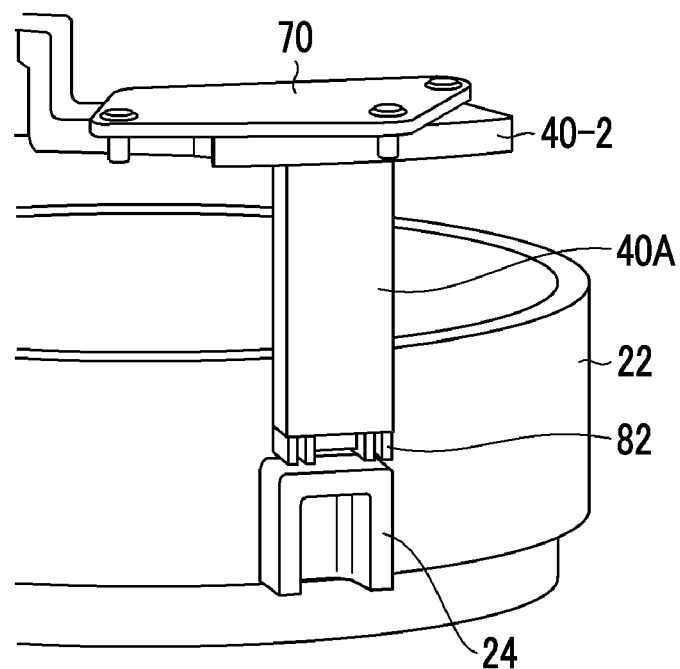
FIG. 8 is a main part perspective view of the lens barrel according to the second embodiment and a view showing a locked state.

FIGS. 7 and 8 are main part perspective views of the lens barrel 1-2 according to the second embodiment, FIG. 7 shows an unlocked state, and FIG. 8 shows a locked state.

As shown in FIGS. 7 and 8, the locking member 40-2 is provided with one locking portion 40A and the movable frame 22 is provided with one engagement portion 24 corresponding to the locking portion 40A.

As shown in FIG. 7, in a case where the locking member 40-2 (locking portion 40A) moves to the unlocking position, the movable frame 22 (focus lens 20) enters an unlocked state and becomes able to move in the optical axis direction.

Meanwhile, in a case where the locking member 40-2 (locking portion 40A) moves to the locking position as shown in FIG. 8, the locking portion 40A (first shock absorbing material 80) becomes able to abut onto the engagement portion 24 of the movable frame 22 and the movable frame 22 (focus lens 20) enters a locked state.

That is, in a case where an external force in an upward direction is applied to the movable frame 22 in FIG. 8, the movement of the movable frame 22 in the upward direction is inhibited since the engagement portion 24 of the movable frame 22 abuts onto the locking portion 40A. Note that, since the movable frame 22 shown in FIGS. 7 and 8 is positioned at an end portion of the movable range of the movable frame 22 and the movement thereof is restricted by the restriction portion 12 as shown in FIG. 1, the movable frame 22 is inhibited from moving downward from the position shown in FIGS. 7 and 8.

The abutting member 70 is formed by using, for example, a metal plate, and is fixed to the fixed frame 10 with a screw. In addition, the abutting member 70 is provided on a side opposite to the engagement portion 24 of the movable frame 22 that has moved to the locking position with the locking member 40-2 (locking portion 40A) interposed therebetween. In addition, the abutting member 70 has a role of receiving an external force in a case where the external force is applied to the movable frame 22 and the external force is applied to the locking member 40-2 from the movable frame 22 via the engagement portion 24 and the locking portion 40A. Accordingly, the locking member 40-2 can be prevented from being damaged.

Note that, in the case of the lens barrel 1-2 of the second embodiment, as with the first embodiment, the locking member 40-2 can be held at the locking position even in a case where the electric motor 52 enters a non-electrification state, because of the irreversible rotation function of the worm gear 56 (FIG. 6).

Third Embodiment

Figure 9:
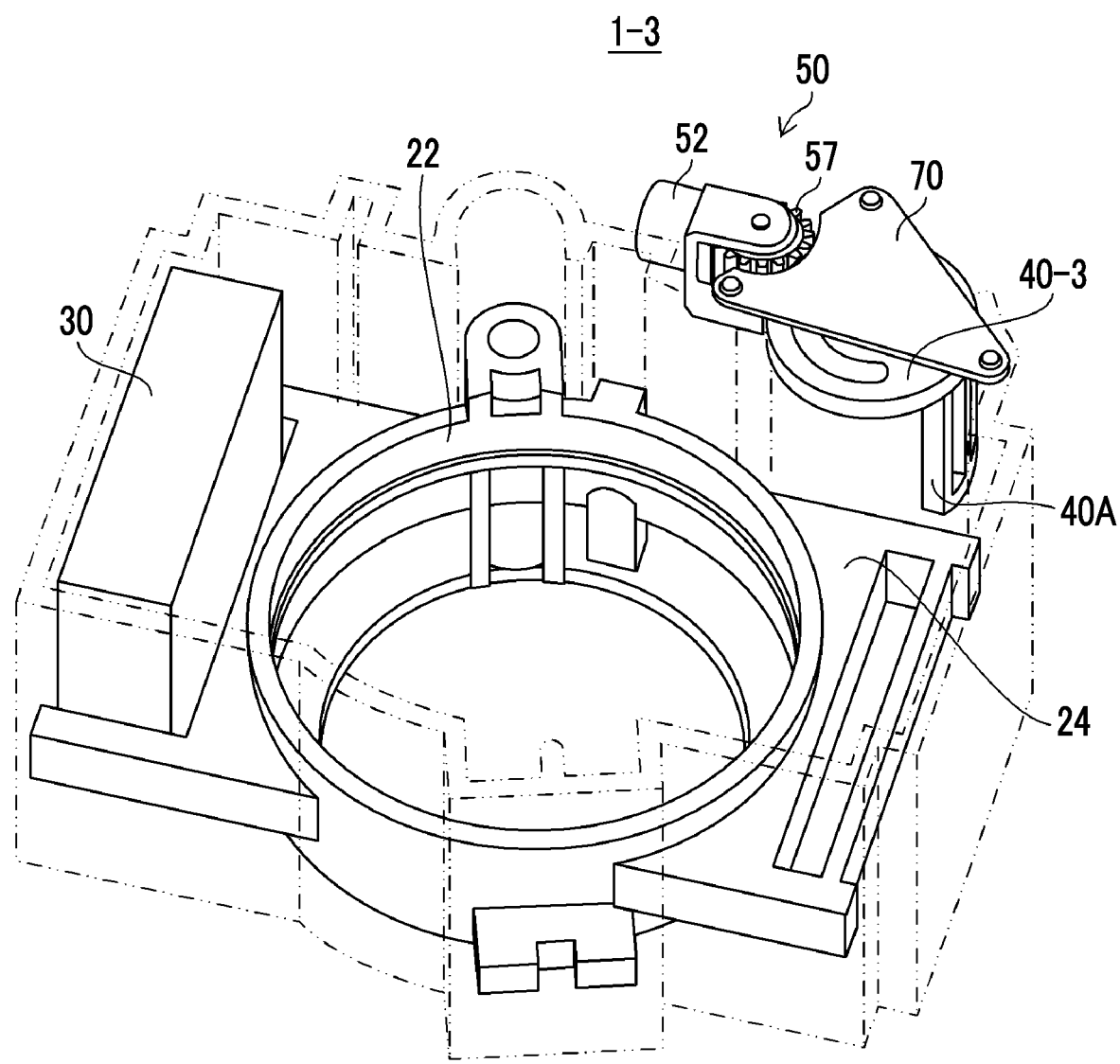
FIG. 9 is a perspective view showing a third embodiment of the lens barrel according to the embodiment of the present invention and is a view showing an unlocked state.
Figure 10:
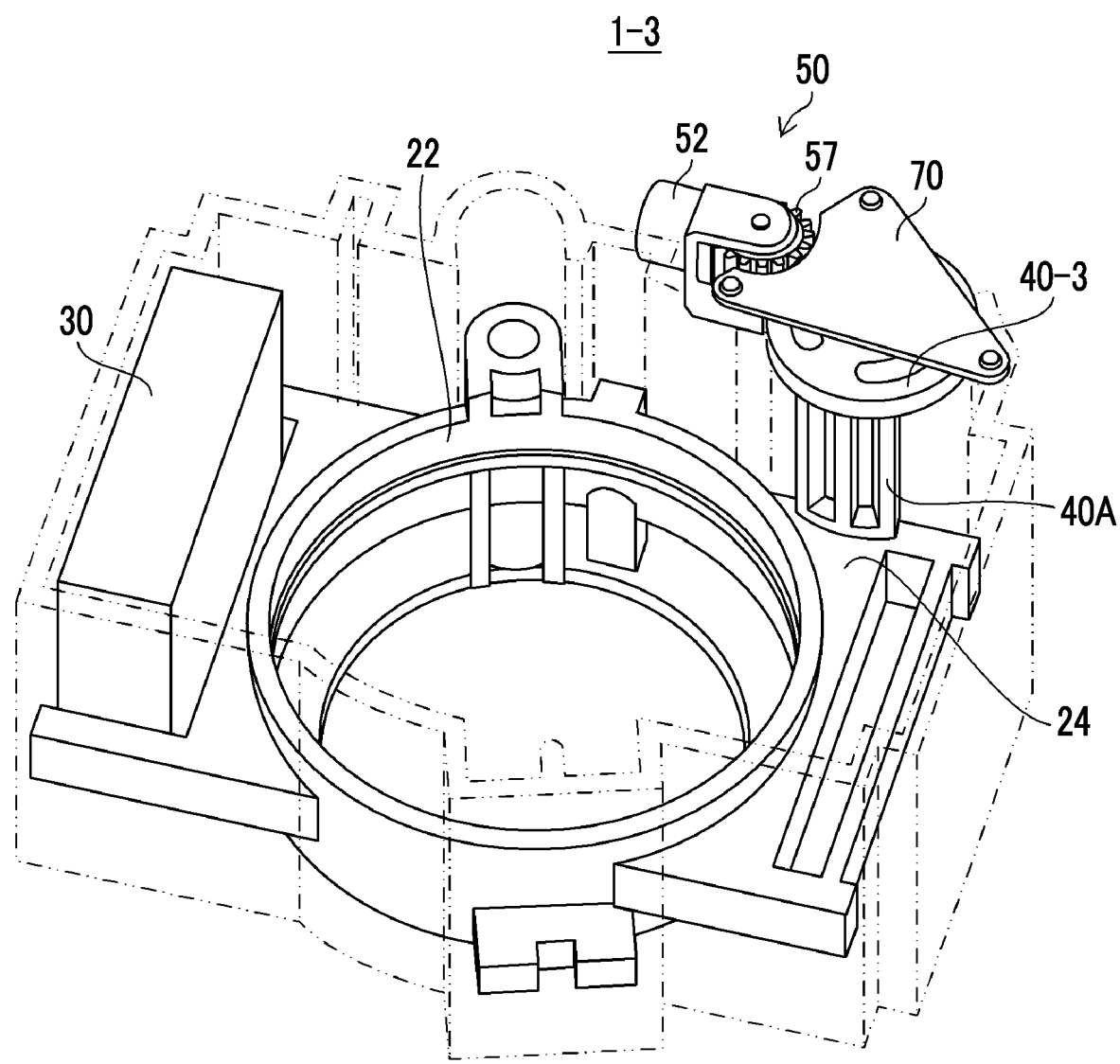
FIG. 10 is a perspective view showing the third embodiment of the lens barrel according to the embodiment of the present invention and is a view showing a locked state.

FIGS. 9 and 10 are perspective views each showing a third embodiment of the lens barrel according to the embodiment of the present invention, FIG. 9 shows an unlocked state, and FIG. 10 shows a locked state. Note that, the same parts as those in the lens barrel in the first embodiment and the second embodiment are given the same reference numerals and detailed description thereof will be omitted.

Mainly a locking member 40-3 of a lens barrel 1-3 of the third embodiment shown in FIGS. 9 and 10 is different from the locking member 40-2 of the lens barrel 1-2 of the second embodiment.

As shown in FIGS. 9 and 10, the locking member 40-3 of the lens barrel 1-3 of the third embodiment is supported to be rotationally movable around a rotation axis that is parallel to the optical axis of the optical member (focus lens 20) and is different from the optical axis.

The locking member 40-3 rotationally moves between an unlocking position shown in FIG. 9 and an locking position shown in FIG. 10 due to a rotational driving force applied from the electric actuator 50.

The movable frame 22 has the engagement portion 24 that projects in a direction orthogonal to the optical axis direction and in a case where the locking member 40-3 moves to the unlocking position shown in FIG. 9, the engagement portion 24 and the locking portion 40A of the locking member 40-3 do not engage with each other such that the movable frame 22 becomes able to move in the optical axis direction.

Meanwhile, in a case where the locking member 40-3 moves to the locking position shown in FIG. 10, the engagement portion 24 and the locking portion 40A of the locking member 40-3 engage with each other such that the movement of the movable frame 22 in the optical axis direction is restricted.

In the case of the lens barrel 1-3 of the third embodiment, as with the first and second embodiments, the locking member 40-3 can be held at the locking position (FIG. 10) even in a case where the electric motor 52 enters a non-electrification state, because of the irreversible rotation function of the worm gear 56 (FIG. 6) of the electric actuator 50.

In addition, the abutting member 70 can receive an external force in a case where the external force is applied to the movable frame 22 and the external force is applied to the locking member 40-3 from the movable frame 22 via the engagement portion 24 and the locking portion 40A and thus the locking member 40-3 can be prevented from being damaged.

Fourth Embodiment

Figure 11:
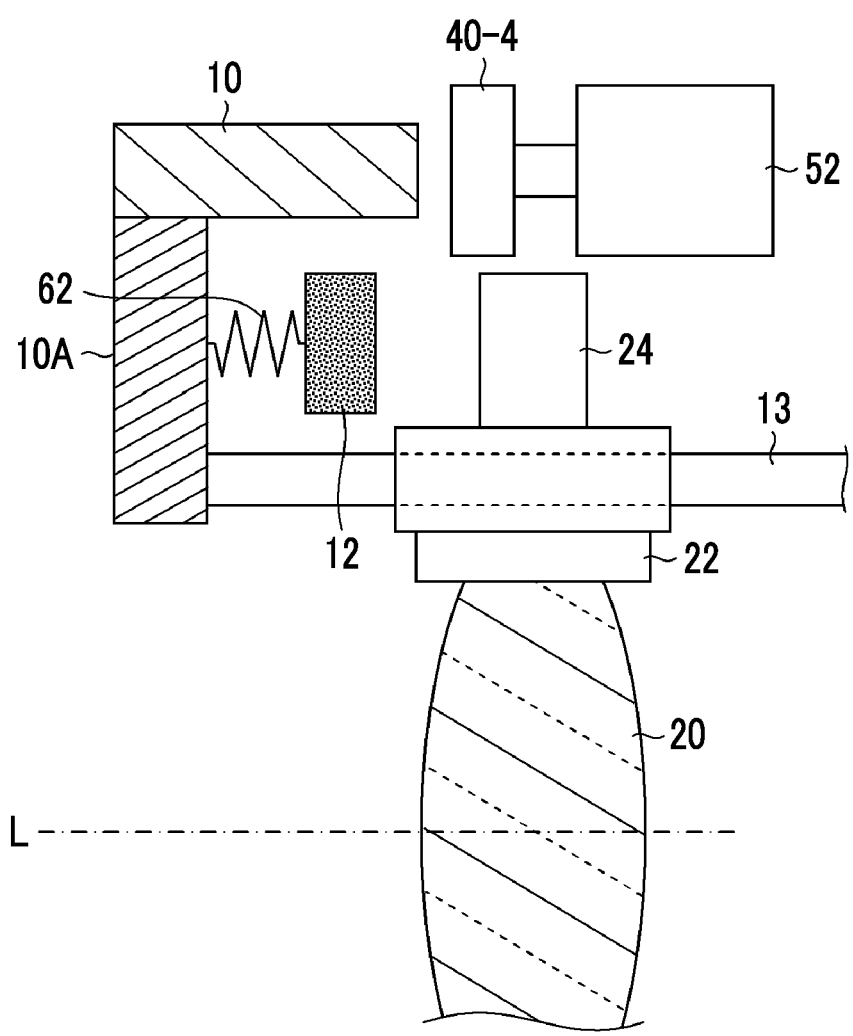
FIG. 11 is a main part sectional view showing a fourth embodiment of the lens barrel according to the embodiment of the present invention and is a view showing an unlocked state.
Figure 12:
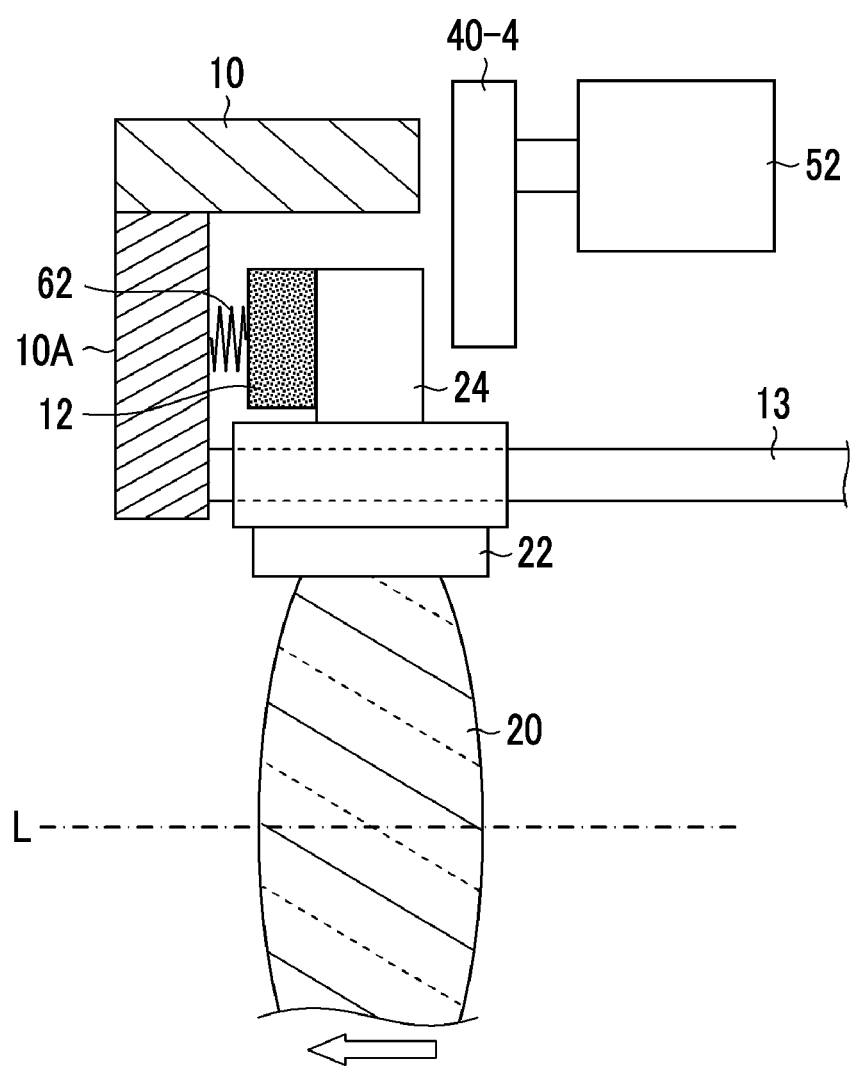
FIG. 12 is a main part sectional view showing the fourth embodiment of the lens barrel according to the embodiment of the present invention and is a view showing a locked state.
Figure 13:
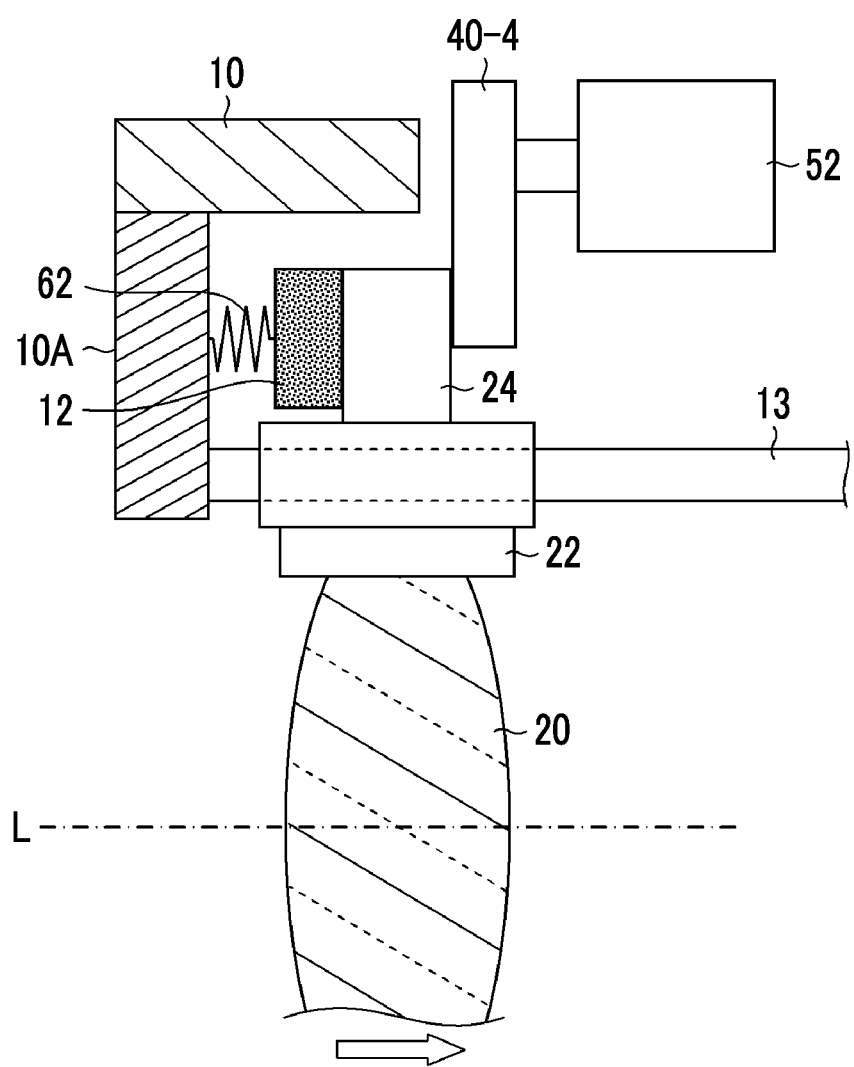
FIG. 13 is a main part sectional view showing the fourth embodiment of the lens barrel according to the embodiment of the present invention and is a view showing a locked state.

Each of FIGS. 11 to 13 is a main part sectional view showing a fourth embodiment of the lens barrel according to the embodiment of the present invention. Note that, regarding a lens barrel 1-4 of the fourth embodiment, the same parts as those in the lens barrel 1 in the first embodiment shown in FIG. 1 are given the same reference numerals and detailed description thereof will be omitted.

FIG. 11 shows a case where the movable frame 22 holding the focus lens 20 is in an unlocked state and the movable frame 22 can be moved in the optical axis direction by means of a linear driving force from the VCMs 30 (FIG. 2).

The restriction portion 12 that restricts movement beyond an end portion on one side (in present example, object side) of the movable range of the movable frame 22 is disposed on the fixed frame 10 side (in present example, supporting member 10A fixed to fixed frame 10) via an elastic member (in present example, coil spring) 62. Note that, the elastic member 62 is not limited to a coil spring and may be another elastic member formed of sponge, rubber, or the like.

A locking member 40-4 is a rotary member disposed on a rotation shaft of the electric motor 52 and can be moved (rotationally moved) to a locking position and an unlocking position by means of a rotational driving force from the electric motor 52. Note that, regarding the locking member 40-4, the rotational driving force may not be directly transmitted from the electric motor 52 to the locking member 40-4 and the rotational driving force may be transmitted from the electric motor 52 to the locking member 40-4 via a speed reduction mechanism.

In a case where the movable frame 22 is to be caused to enter a locked state from an unlocked state of the movable frame 22 as shown in FIG. 11 in the lens barrel 1-4 configured as described above, first, by means of a linear driving force from the VCMs 30 that move the movable frame 22 in the optical axis direction, the movable frame 22 is moved to the end portion on the one side (in present example, object side) of the movable range of the movable frame 22.

FIG. 12 shows a state where the movable frame 22 is moved to the end portion on the object side by means of the linear driving force in the optical axis direction from the VCMs 30. In this case, the linear driving force is applied from the VCMs 30 to the elastic member 62 via the engagement portion 24 of the movable frame 22 and as shown in FIG. 12, the elastic member 62 is compressed from a state shown in FIG. 11. In a case where the elastic member 62 is compressed by the movable frame 22 (that is, in case where movable frame 22 moves until elastic member 62 is compressed), the locking member 40-4 becomes able to rotationally move without interfering with the engagement portion 24 of the movable frame 22.

In a case where the electric motor 52 causes the locking member 40-4 to rotationally move to the locking position as shown in FIG. 12 in this state, a distal end portion of the locking member 40-4 becomes able to engage with an end surface of the engagement portion 24 of the movable frame 22 that is on a side opposite to an object side end surface.

Next, the VCMs 30 are caused to enter a non-electrification state and the electric motor 52 is caused to enter a non-electrification state. With the VCMs 30 being not electrified, the elastic member 62 in a compressed state expands to move the movable frame 22 in a direction opposite to a direction toward the object side and causes the engagement portion 24 of the movable frame 22 to abut onto the locking member 40-4.

Accordingly, as shown in FIG. 13, the engagement portion 24 of the movable frame 22 is interposed between the restriction portion 12 and the locking member 40-4 and the movable frame 22 is fixed (locked) to become unable to move.

Further, a pressing force is applied by the elastic member 62 to an abutting surface at which the engagement portion 24 of the movable frame 22 and the locking member 40-4 abut onto each other. Since a frictional force against the movement of the locking member 40-4 (rotational movement of locking member 40-4 caused by external force that is repeatedly applied via movable frame 22 with lens barrel 1 shaken) is generated because of the pressing force, the locking member 40-4 can be held at the locking position even in a case where the electric motor 52 enters a non-electrification state.

In this case, the elastic member 62 functions as a portion of a holding mechanism that inhibits the movement of the locking member 40-4 and holds the movable frame 22 at the locking position. In addition, it is preferable that the abutting surface at which the engagement portion 24 of the movable frame 22 and the locking member 40-4 abut onto each other is processed to have a large friction coefficient or provided with a friction material having a large friction coefficient.

Fifth Embodiment

Figure 14:
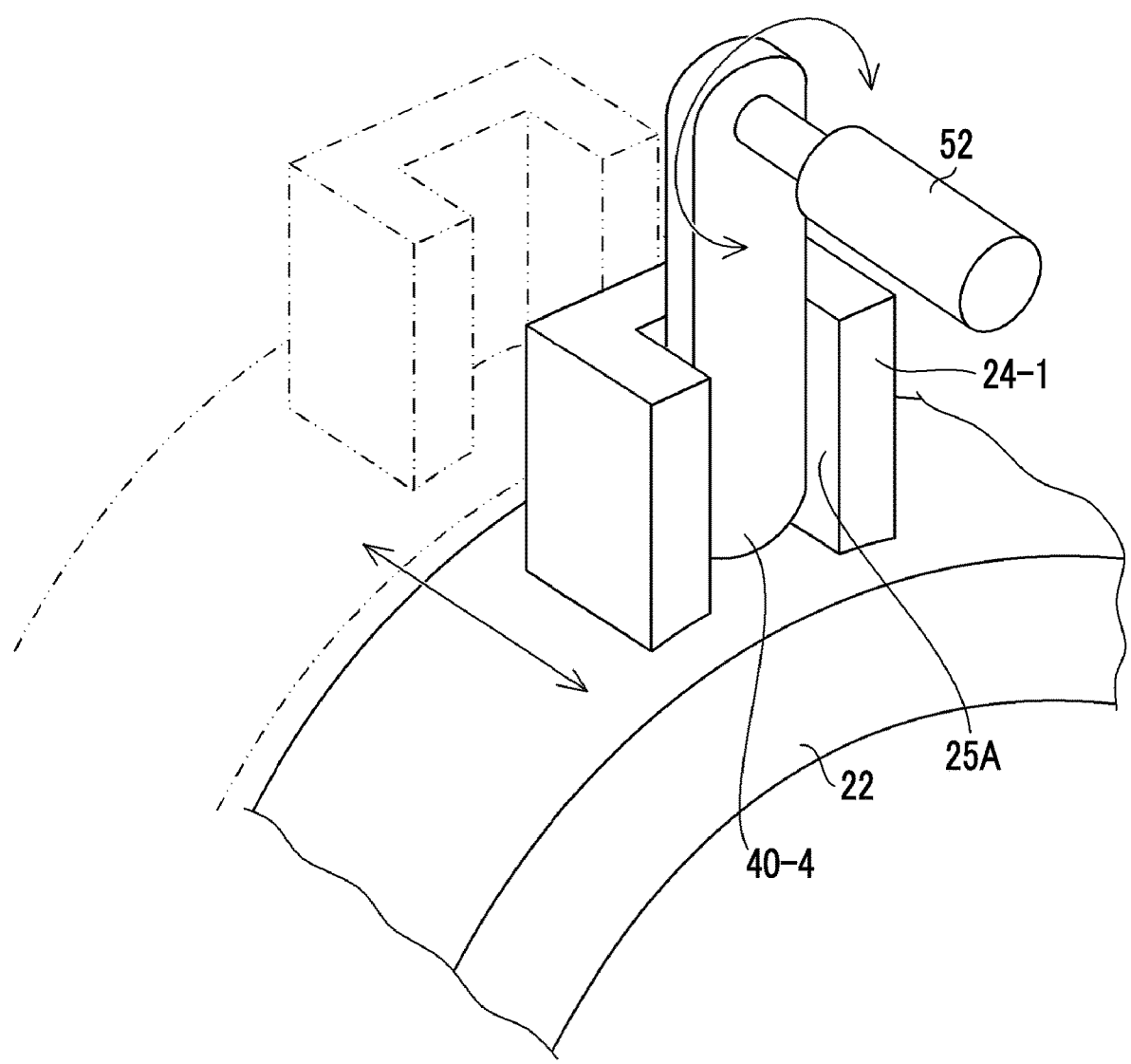
FIG. 14 is a main part perspective view showing a fifth embodiment of the lens barrel according to the embodiment of the present invention.

FIG. 14 is a main part perspective view showing a fifth embodiment of the lens barrel according to the embodiment of the present invention. Note that, regarding a lens barrel 1-5 of the fifth embodiment, the same parts as those in the lens barrel 1-4 in the fourth embodiment shown in FIG. 11 or the like are given the same reference numerals and detailed description thereof will be omitted.

The shape of an engagement portion 24-1 of the movable frame 22 of the lens barrel 1-5 of the fifth embodiment shown in FIG. 14 is different from the shape of the engagement portion 24 of the movable frame 22 of the lens barrel 1-4 of the fourth embodiment.

That is, a recess portion 25A that inhibits the rotational movement of the locking member 40-4 in a case where the locking member 40-4 engages with the recess portion 25A is formed in the engagement portion 24-1 of the movable frame 22 of the lens barrel 1-5.

According to the lens barrel 1-5 of the fifth embodiment, the movable frame 22 is moved to one end of the movable range thereof (position represented by two-dot chain line in FIG. 14) by the linear driving force of the VCMs 30. Thereafter, the locking member 40-4 is caused to rotationally move to a locking position (position at which locking member 40-4 engages with recess portion 25A of engagement portion 24-1) by the electric motor 52 and the VCMs 30 are caused to enter a non-electrification state. With the VCMs 30 being not electrified, the elastic member 62 in a compressed state (FIG. 12) moves the movable frame 22 from the position represented by the two-dot chain line to a position represented by a solid line such that the recess portion 25A of the engagement portion 24-1 of the movable frame 22 and the locking member 40-4 engage with each other at this position.

Therefore, even in a case where the lens barrel 1-5 is shaken and an external force is repeatedly applied to the locking member 40-4 via the movable frame 22, since the recess portion 25A and the locking member 40-4 engages with each other, rotation of the locking member 40-4 can be inhibited and the position (locking position) of the locking member 40-4 can be maintained. In this case, the elastic member 62 (FIG. 11 or like) that urges the movable frame 22 in the optical axis direction via the restriction portion 12 and the recess portion 25A of the engagement portion 24-1 provided on the movable frame 22 act as the holding mechanism that holds the locking member 40-4 at the locking position in a case where the electric motor 52 is turned off.

Sixth Embodiment

Figure 15:
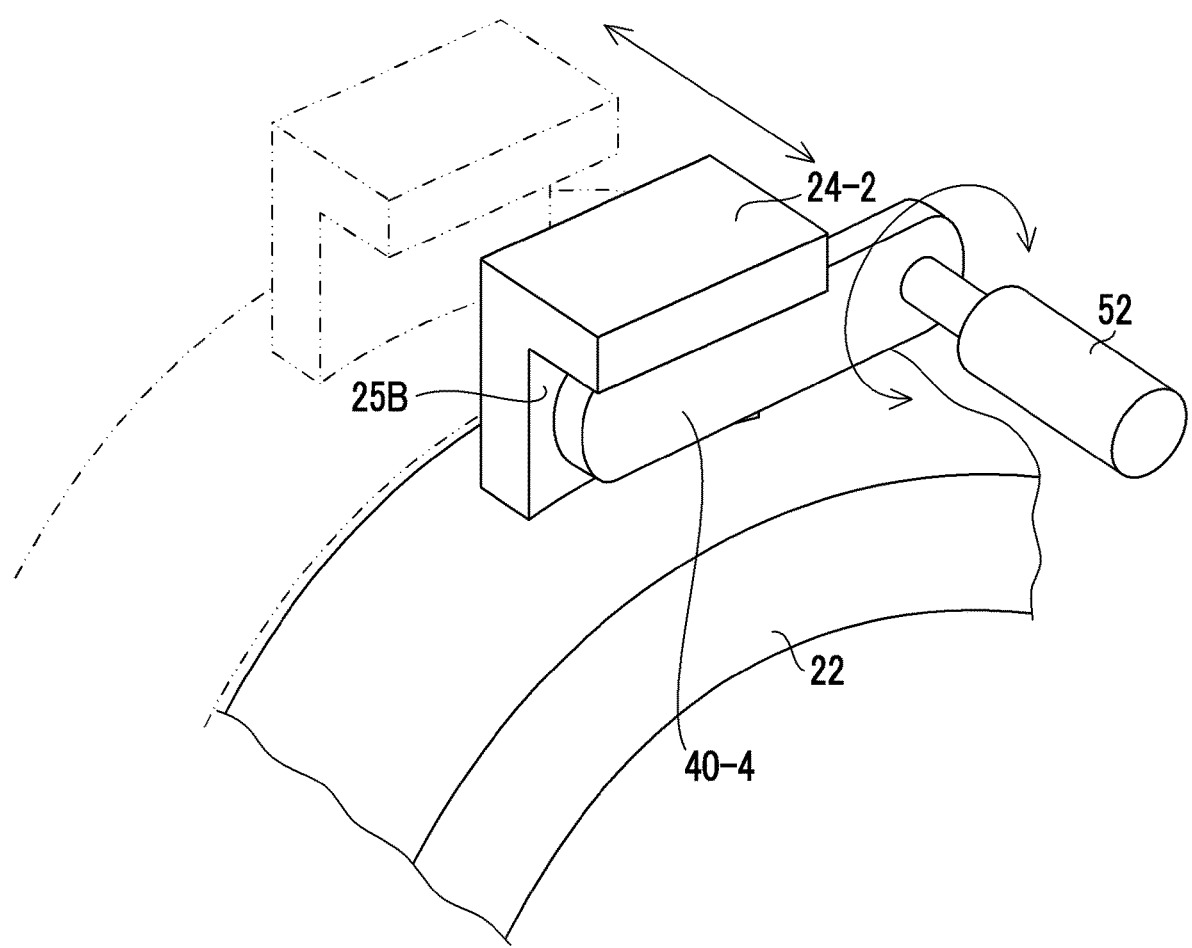
FIG. 15 is a main part perspective view showing a sixth embodiment of the lens barrel according to the embodiment of the present invention.

FIG. 15 is a main part perspective view showing a sixth embodiment of the lens barrel according to the embodiment of the present invention. Note that, regarding a lens barrel 1-6 of the sixth embodiment, the same parts as those in the lens barrel 1-5 in the fifth embodiment shown in FIG. 14 are given the same reference numerals and detailed description thereof will be omitted.

Mainly the shape of an engagement portion 24-2 of the movable frame 22 of the lens barrel 1-6 of the sixth embodiment shown in FIG. 15 is different from the shape of the engagement portion 24-1 of the movable frame 22 of the lens barrel 1-5 of the fifth embodiment.

The engagement portion 24-2 of the movable frame 22 of the lens barrel 1-6 is formed in a hook-like shape and a recess portion 25B that inhibits the rotational movement of the locking member 40-4 is formed between a side surface of the movable frame 22 and the engagement portion 24-2. That is, the recess portion 25B of the engagement portion 24-2 of the movable frame 22 of the sixth embodiment and the recess portion 25A of the engagement portion 24-1 of the movable frame 22 of the fifth embodiment are different in orientation of the recess portion and are the same as each other in other points.

Therefore, even in a case where the lens barrel 1-6 is shaken and an external force is repeatedly applied to the locking member 40-4 via the movable frame 22, since the recess portion 25B and the locking member 40-4 engages with each other, rotation of the locking member 40-4 can be inhibited and the position (locking position) of the locking member 40-4 can be maintained.

Seventh Embodiment

Figure 16:
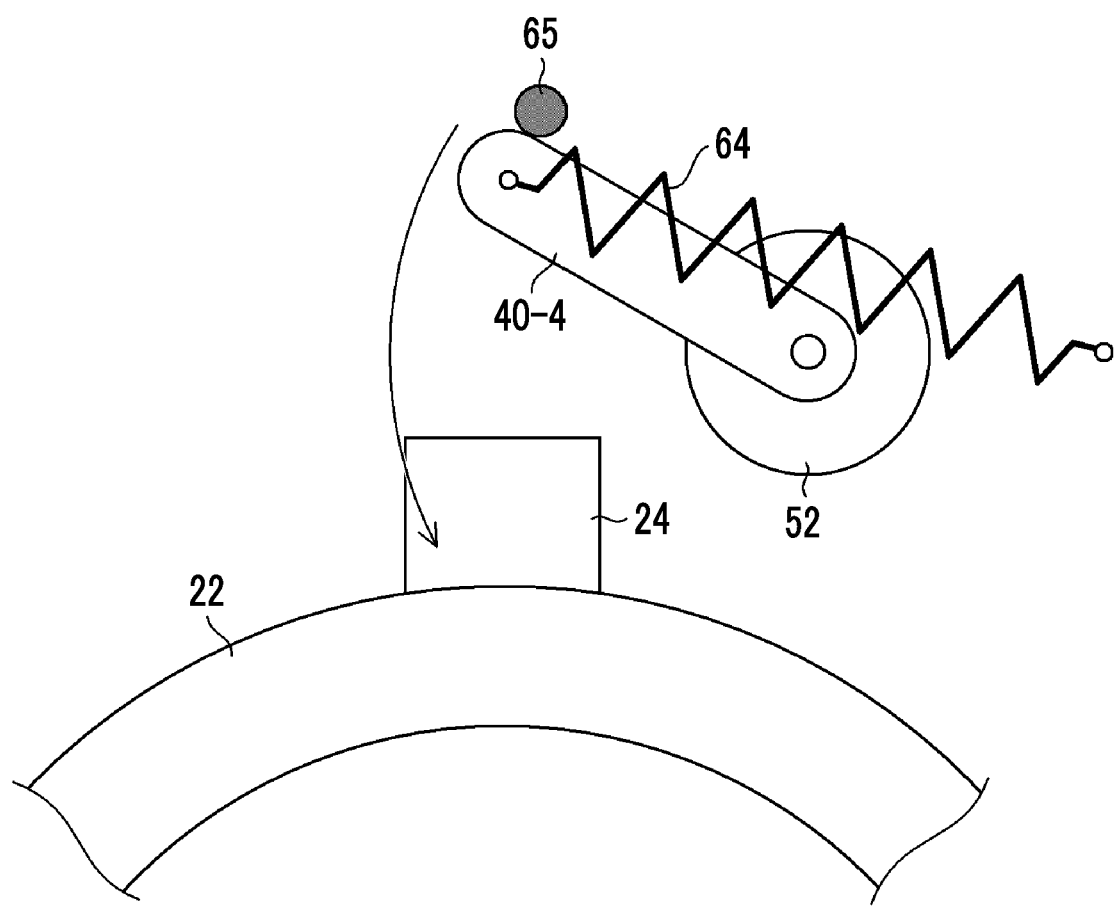
FIG. 16 is a main part sectional view showing a seventh embodiment of the lens barrel according to the embodiment of the present invention and is a view showing an unlocked state.
Figure 17:
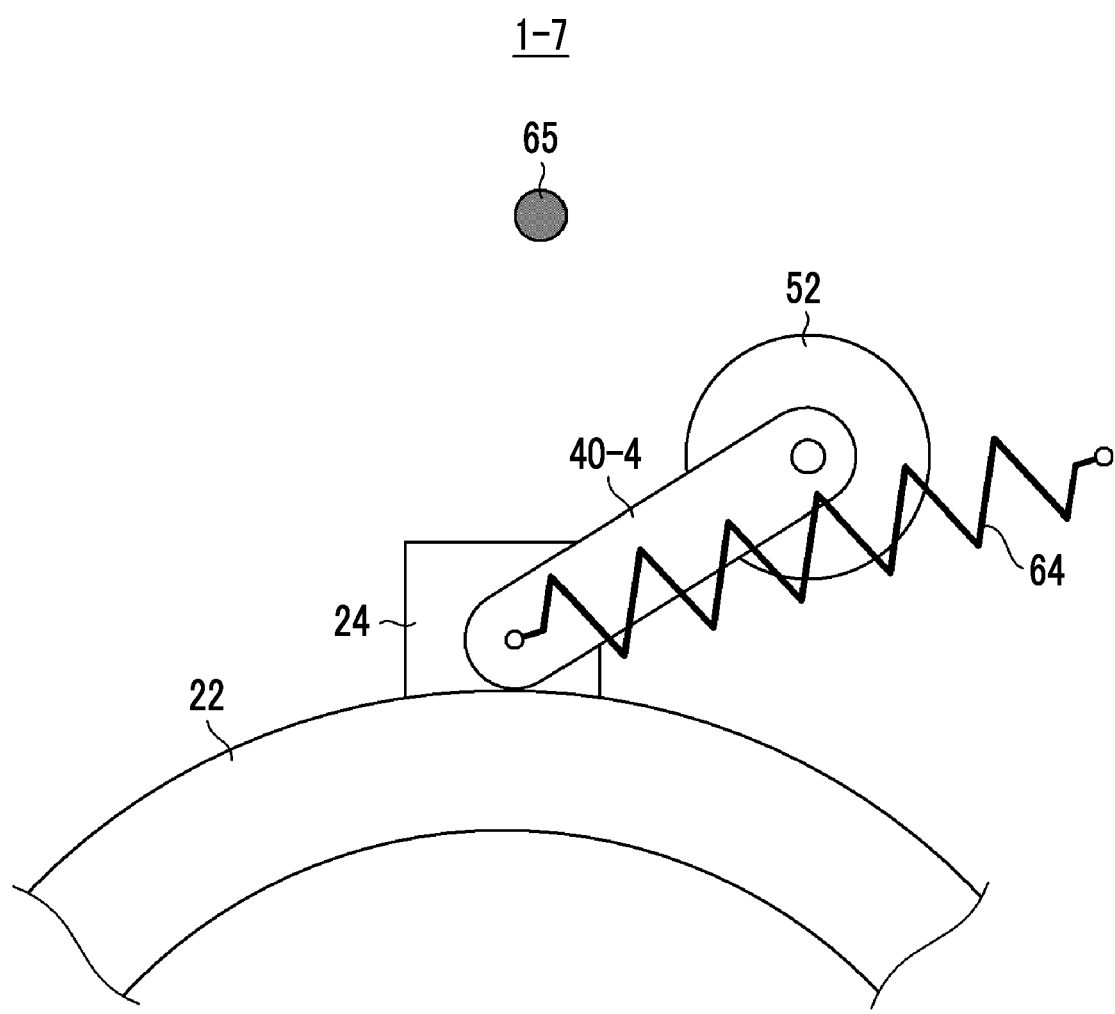
FIG. 17 is a main part sectional view showing the seventh embodiment of the lens barrel according to the embodiment of the present invention and is a view showing a locked state.

Each of FIGS. 16 and 17 is a main part sectional view showing a seventh embodiment of the lens barrel according to the embodiment of the present invention. Note that, regarding a lens barrel 1-7 of the seventh embodiment, the same parts as those in the lens barrel 1-4 in the fourth embodiment shown in FIG. 11 are given the same reference numerals and detailed description thereof will be omitted.

The lens barrel 1-7 of the seventh embodiment shown in FIGS. 16 and 17 is different mainly in terms of a holding mechanism that holds the locking member 40-4 at the unlocking position and the locking position, the locking member 40-4 being rotationally moved by the electric motor 52.

The holding mechanism is composed of a spring member (tension spring) 64 provided between a distal end portion of the locking member 40-4 and the fixed frame 10 side.

As shown in FIG. 16, in a case where the locking member 40-4 is caused to rotationally move by the electric motor 52 in a clockwise direction in FIG. 16 and abuts onto a stopper (second stopper) 65, an urging force in the clockwise direction is applied to the locking member 40-4 by the tension spring 64. Accordingly, the locking member 40-4 is held at a position (unlocking position at which locking member 40-4 is withdrawn from engagement portion 24 of movable frame 22) at which the locking member 40-4 abuts onto the stopper 65 even in a case where the electric motor 52 is turned off.

Meanwhile, in a case where the locking member 40-4 is caused to rotationally move by the electric motor 52 in a counterclockwise direction (direction represented by arrow) in FIG. 16 and the distal end portion of the locking member 40-4 abuts onto the side surface (first stopper) of the movable frame 22 as shown in FIG. 17, an urging force in the counterclockwise direction is applied to the locking member 40-4 by the tension spring 64. Accordingly, the locking member 40-4 is held at a position (locking position at which locking member 40-4 can engage with engagement portion 24 of movable frame 22) at which the distal end portion abuts onto the side surface of the movable frame 22 even in a case where the electric motor 52 is turned off.

That is, the locking position and the unlocking position of the locking member 40-4 are positioned on opposite sides with a neutral position, at which the tension spring 64 expands most, interposed therebetween. In a case where the locking member 40-4 is caused to rotationally move in a direction (counterclockwise direction) toward the locking position beyond the neutral position, the locking member 40-4 is urged by the tension spring 64 in the counterclockwise direction and the distal end portion of the locking member 40-4 abuts onto the side surface (first stopper) of the movable frame 22 such that rotational movement is restricted. In addition, in a case where the locking member 40-4 is caused to rotationally move in a direction (clockwise direction) toward the unlocking position beyond the neutral position, the locking member 40-4 is urged by the tension spring 64 in the clockwise direction and the distal end portion of the locking member 40-4 abuts onto the stopper 65 such that rotational movement is restricted.

Therefore, even in a case where the lens barrel 1-7 is shaken and a force is repeatedly applied to the locking member 40-4 via the movable frame 22, the urging force of the tension spring 64 becomes resistance against the rotational movement of the locking member 40-4 in a direction toward the unlocking position and thus the locking member 40-4 can be maintained at a locked state.

Eighth Embodiment

Figure 18:
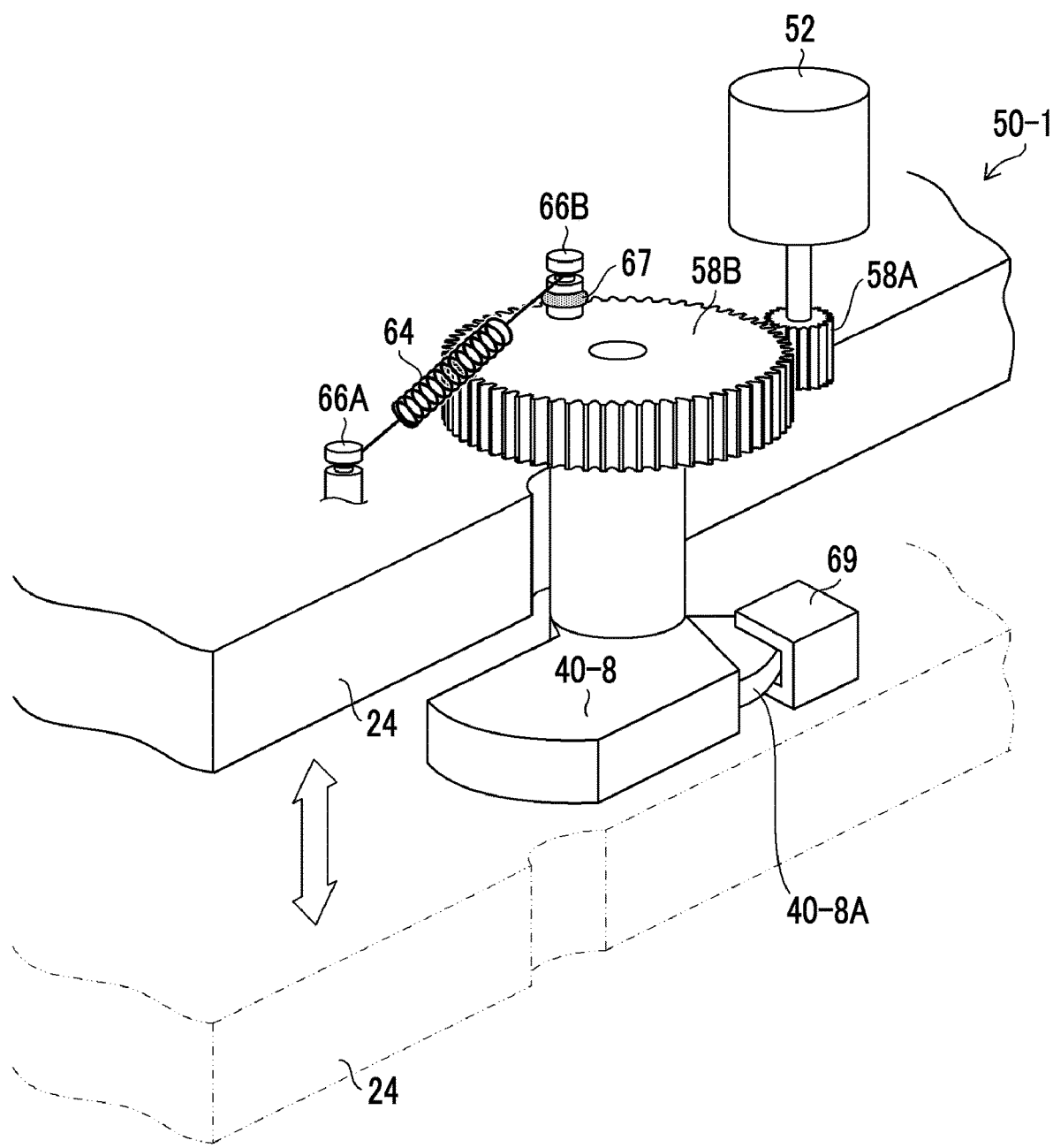
FIG. 18 is a main part perspective view showing an eighth embodiment of the lens barrel according to the embodiment of the present invention and is a view showing an unlocked state.
Figure 19:
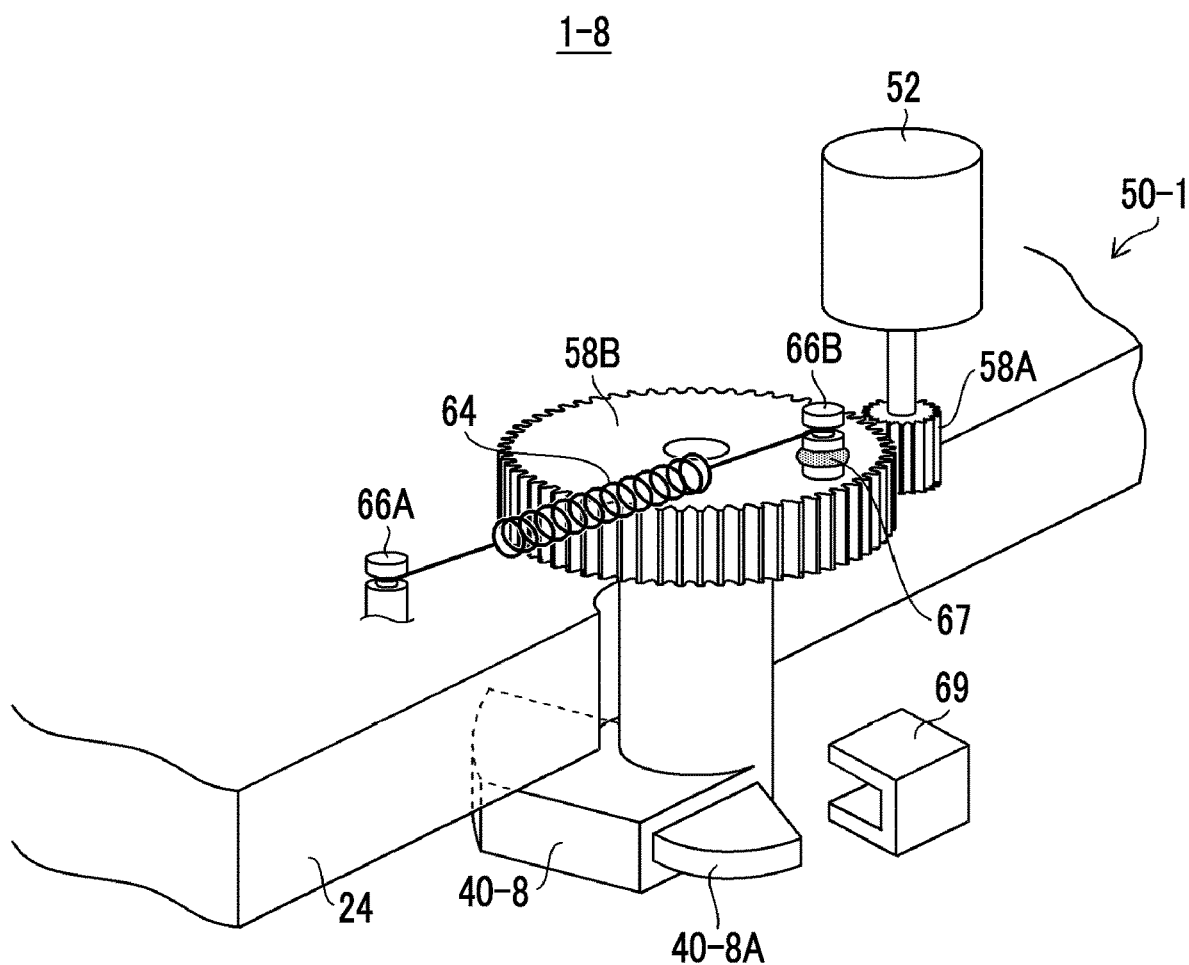
FIG. 19 is a main part perspective view showing the eighth embodiment of the lens barrel according to the embodiment of the present invention and is a view showing a locked state.

FIGS. 18 and 19 are main part perspective views each showing an eighth embodiment of the lens barrel according to the embodiment of the present invention, FIG. 18 shows an unlocked state, and FIG. 19 shows a locked state. Note that, regarding a lens barrel 1-8 of the eighth embodiment, the same parts as those in the lens barrel 1-7 in the seventh embodiment shown in FIGS. 16 and 17 are given the same reference numerals and detailed description thereof will be omitted.

The lens barrel 1-8 of the eighth embodiment shown in FIGS. 18 and 19 is a modification example of the lens barrel 1-7 of the seventh embodiment shown in FIGS. 16 and 17, is the same as the seventh embodiment in a point that the lens barrel 1-8 comprises the tension spring 64 as a holding mechanism holding the engagement portion 24 provided on the movable frame 22 (refer to FIG. 16) that holds the optical member (focus lens) at an unlocking position and a locking position and a mechanism that moves (rotationally moves) a locking member 40-8 is different from that in the seventh embodiment.

An electric actuator 50-1 that causes the locking member 40-8 to move (rotationally move) is composed of the electric motor 52, a first gear 58A functioning as a power transmission mechanism that transmits a rotational driving force of the electric motor 52 to the locking member 40-8, and a second gear 58B provided to be coaxial with the locking member 40-8 and causes the locking member 40-8 to rotationally move between a first position (locking position) and a second position (unlocking position).

Here, the locking position of the locking member 40-8 means a position at which the locking member 40-8 engages with the engagement portion 24 provided on a movable frame such that the movement of the movable frame in the optical axis direction is inhibited as shown in FIG. 19 and the unlocking position of the locking member 40-8 means a position at which the locking member 40-8 is withdrawn from the engagement portion 24 provided on the movable frame such that the movable frame becomes movable in the optical axis direction (direction along arrow in FIG. 18) as shown in FIG. 18.

A holding mechanism that holds the locking member 40-8 at the locking position and the unlocking position is the tension spring 64 that is disposed between a first pin 66A that is embedded into a fixed frame of the lens barrel and a pin (second pin) 66B that is embedded into the second gear 58B.

A rotation shaft of the electric motor 52 is provided with the first gear 58A and the first gear 58A meshes with the second gear 58B. The locking member 40-8 is fixed to the other end of the rotation shaft to which the second gear 58B is fixed. Accordingly, the rotational driving force of the electric motor 52 is transmitted to the locking member 40-8 via the first gear 58A and the second gear 58B and the locking member 40-8 can be caused to rotationally move. Note that, the rotational driving force may be transmitted to the second gear 58B from the first gear 58A provided for the rotation shaft of the electric motor 52 via another gear (speed reduction gear train).

In addition, one end of the locking member 40-8 is provided with a light blocking member 40-8A and the lens barrel 1-8 comprises a photo interrupter 69 for detecting the presence or absence of the light blocking member 40-8A.

The photo interrupter 69 functions as a position detection unit that detects whether or not the locking member 40-8 is held at the locking position. In the present example, in a case where a light path of the photo interrupter 69 enters a light-blocked state due to the light blocking member 40-8A (in case as shown in FIG. 18), it is determined that the locking member 40-8 is held at the unlocking position and in a case where the light path of the photo interrupter 69 enters a light-unblocked state due to the light blocking member 40-8A (in case as shown in FIG. 19), it is determined that the locking member 40-8 is held at the locking position.

Next, a locking and unlocking operation of the movable frame of the lens barrel 1-8 configured as described above will be described.

Figure 20:
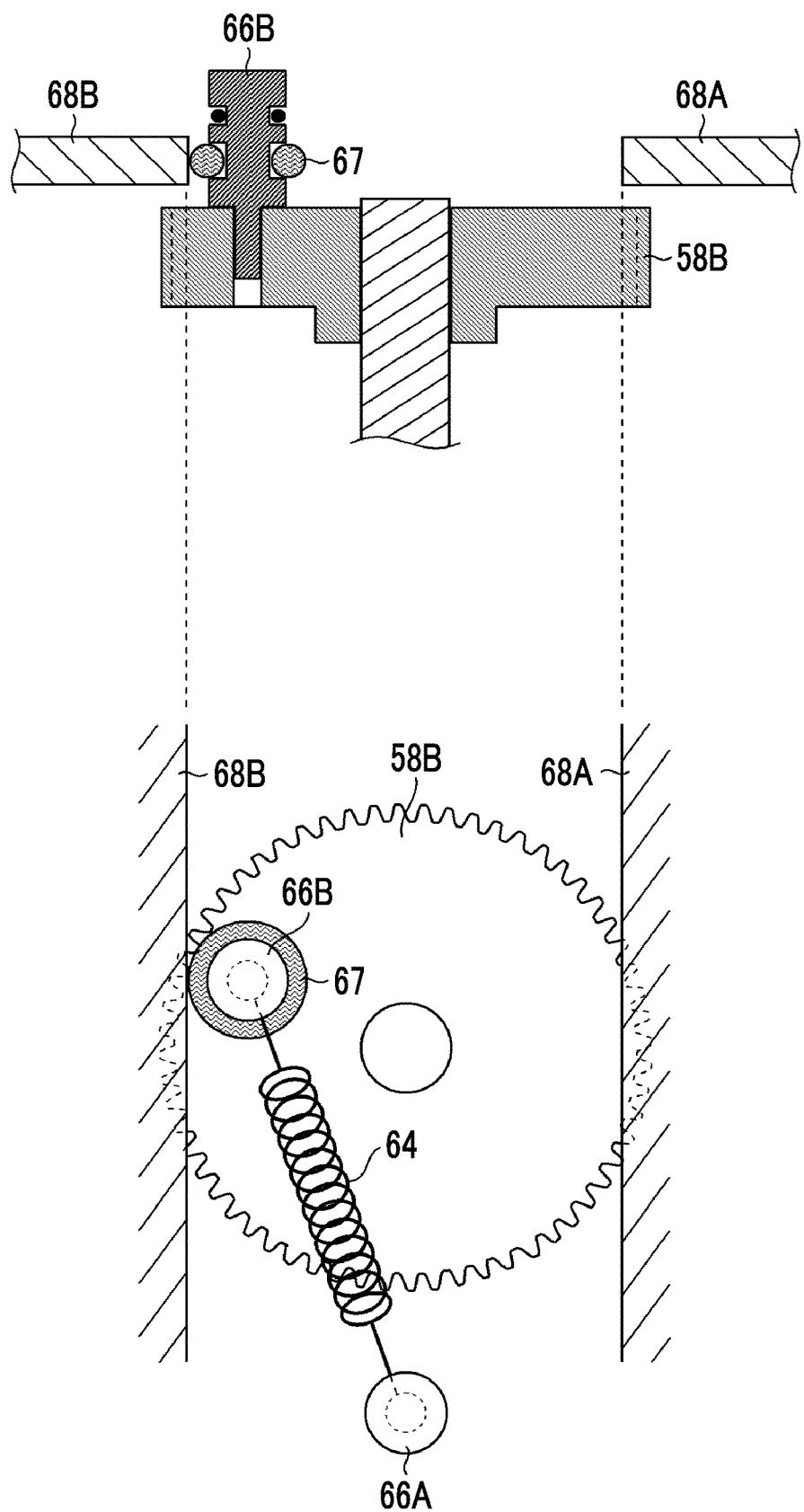
FIG. 20 is a view used for describing the operation of the eighth embodiment the lens barrel according to the embodiment of the invention, and is a view showing a locked state.
Figure 21:
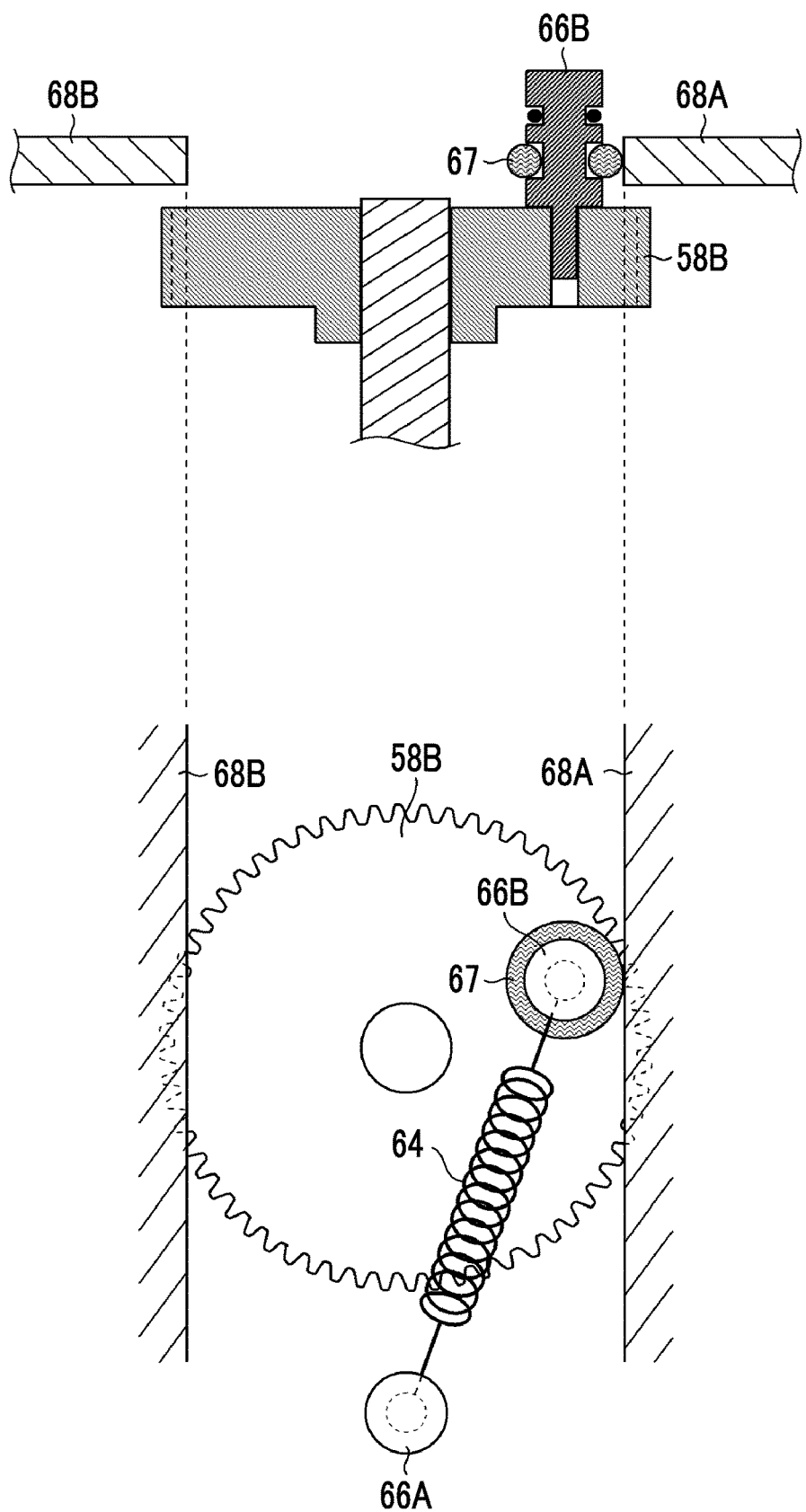
FIG. 21 is a view used for describing the operation of the eighth embodiment the lens barrel according to the embodiment of the invention, and is a view showing an unlocked state.

Each of FIGS. 20 and 21 is a view used for describing the operation of the lens barrel 1-8, FIG. 20 shows an unlocked state, and FIG. 21 shows a locked state.

In FIGS. 18 to 21, in a case where the electric motor 52 is driven to rotate forward or reversely and the second gear 58B is driven in a direction (counterclockwise direction) toward the unlocking position beyond a neutral position (position at which first pin 66A, rotation shaft of second gear 58B, and second pin 66B are arranged on one straight line) at which the tension spring 64 expands most, a rotational driving force in the counterclockwise direction acts on the second gear 58B due to an urging force of the tension spring 64.

Meanwhile, in a case where the electric motor 52 is driven to rotate forward or reversely and the second gear 58B is driven in a direction (clockwise direction) toward the locking position beyond the neutral position of the tension spring 64, a rotational driving force in the clockwise direction acts on the second gear 58B due to the urging force of the tension spring 64.

In addition, the fixed frame of the lens barrel 1-8 is provided with a first stopper 68A and a second stopper 68B that restricts the rotational movement range of the second gear 58B (the locking member 40-8). Furthermore, an O-ring 67 functioning as an elastic body is mounted onto the second pin 66B embedded in the second gear 58B.

Therefore, as shown in a lower part of FIG. 20, in a case where the O-ring 67 mounted onto the second pin 66B abuts onto the second stopper 68B (end surface thereof) (in case where second gear 58B is caused to rotationally move to unlocking position), the tension spring 64 urges the second gear 58B in the counterclockwise direction and thus the second gear 58B (locking member 40-8) can be maintained at the unlocking position even in a case where the electric motor 52 is turned off.

Similarly, as shown in a lower part of FIG. 21, in a case where the O-ring 67 mounted onto the second pin 66B abuts onto the first stopper 68A (end surface thereof) (in case where second gear 58B is caused to rotationally move to locking position), the tension spring 64 urges the second gear 58B in the clockwise direction and thus the second gear 58B (locking member 40-8) can be maintained at the locking position even in a case where the electric motor 52 is turned off.

Other Embodiments

Figure 22:
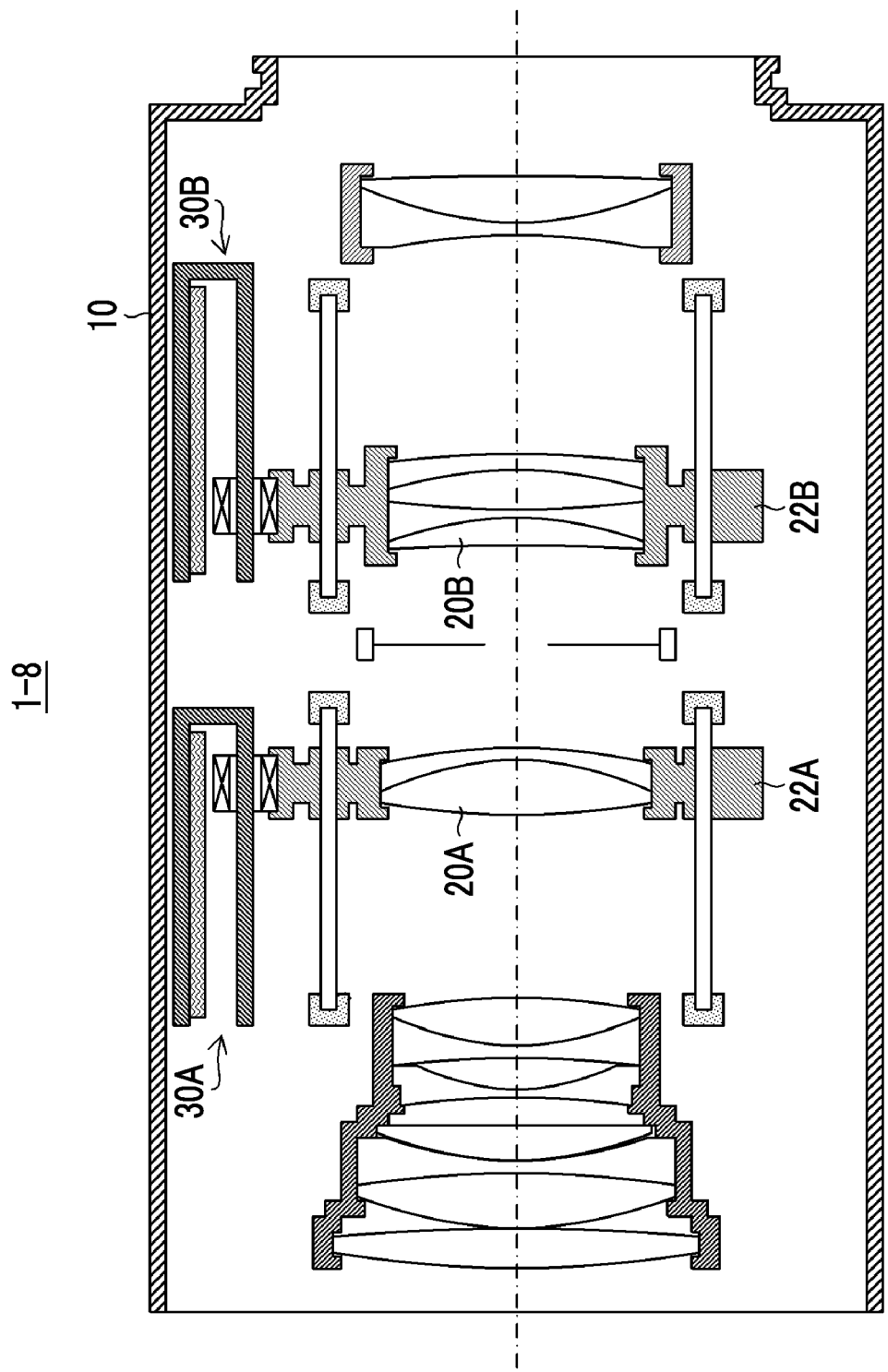
FIG. 22 is a main part sectional view showing another embodiment of the lens barrel to which the present invention is applied.

FIG. 22 is a main part sectional view showing another embodiment of the lens barrel to which the present invention is applied.

A lens barrel 1-9 shown in FIG. 22 comprises a first focus lens 20A (first optical member) on an object side and a second focus lens 20B (second optical member) on an image formation side that are driven in opposite directions in the case of focusing. That is, for the lens barrel 1-9, a floating mechanism in which focusing is performed by changing an interval between the first focus lens 20A and the second focus lens 20B is adopted.

A first movable frame 22A holding the first focus lens 20A and a second movable frame 22B holding the second focus lens 20B are supported to be movable with respect to the fixed frame 10 in the optical axis direction and are driven independently of each other by corresponding VCMs 30A and 30B (first linear motor and second linear motor), respectively.

<First Locking Mechanism Applied to Lens Barrel 1-9>

Figure 23:
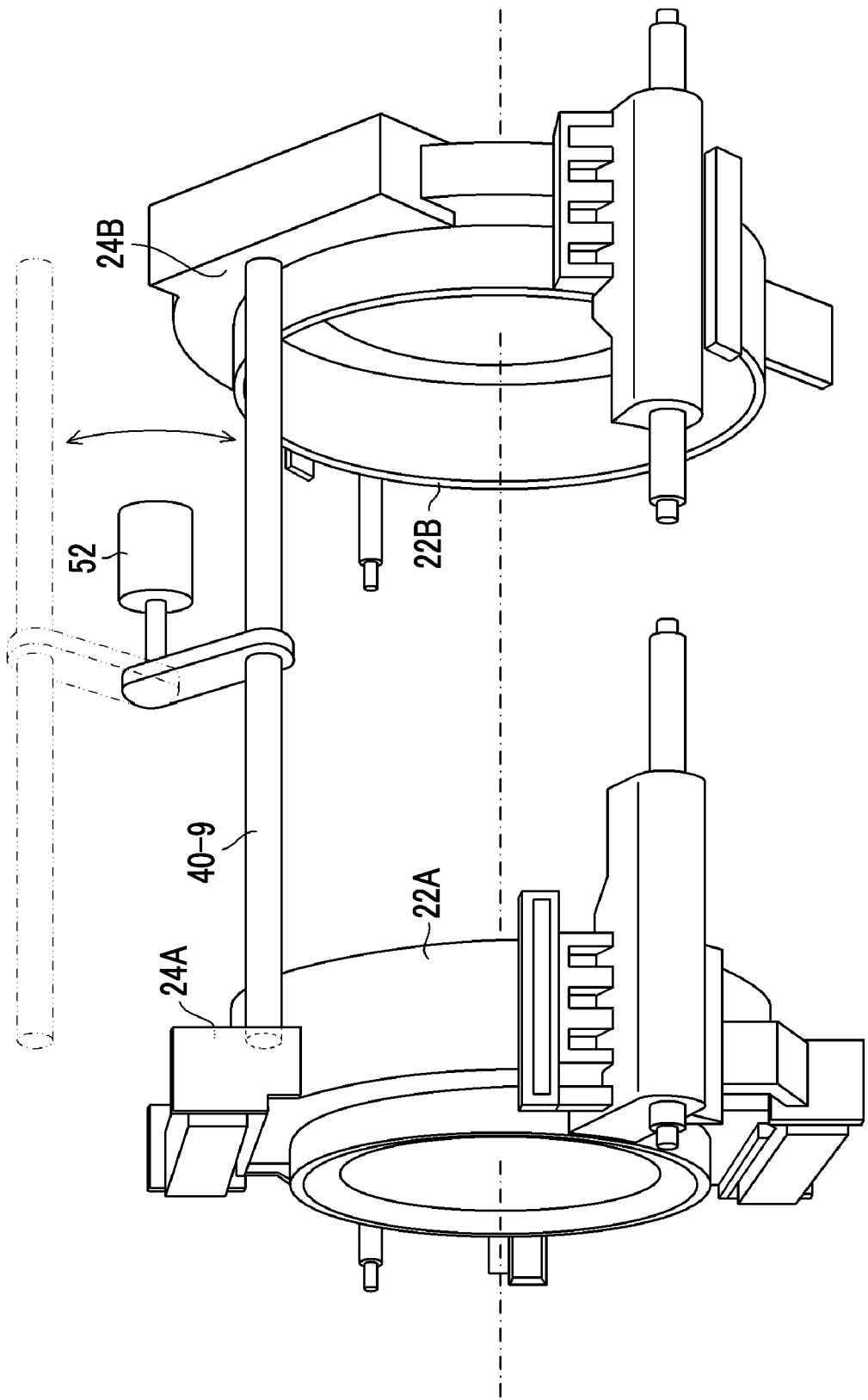
FIG. 23 is a perspective view showing a first locking mechanism applied to the lens barrel shown in FIG. 22.

FIG. 23 is a perspective view showing a first locking mechanism applied to the lens barrel 1-9 shown in FIG. 22.

The first locking mechanism shown in FIG. 23 locks the first movable frame 22A and the second movable frame 22B at the same time and includes a first restriction portion and a second restriction portion (not shown) that are provided on the fixed frame 10 (FIG. 22), a first engagement portion 24A and a second engagement portion 24B provided on the first movable frame 22A and the second movable frame 22B respectively, and a locking member 40-9.

Each of the first restriction portion and the second restriction portion is configured in the same manner as the restriction portion 12 supported by the elastic member 62 shown in FIG. 11, the first restriction portion is a member that abuts onto the first movable frame 22A at an object side end portion of the movable range of the first movable frame 22A and restricts the movement of the first movable frame 22A, and the second restriction portion is a member that abuts onto the second movable frame 22B at an image formation side end portion of the movable range of the second movable frame 22B and restricts the movement of the second movable frame 22B.

The locking member 40-9 can be caused to rotationally move by the electric motor 52 between a locking position shown in FIG. 23 and an unlocking position represented by a two-dot chain line. That is, the locking member 40-9 has a length corresponding to an interval between the first engagement portion 24A and the second engagement portion 24B that is formed when the first movable frame 22A and the second movable frame 22B abut onto the first restriction portion and the second restriction portion respectively, is inserted into a space between the first engagement portion 24A and the second engagement portion 24B in a case where the first movable frame 22A and the second movable frame 22B are to be locked, and is withdrawn from the space between the first engagement portion 24A and the second engagement portion 24B in a case where the first movable frame 22A and the second movable frame 22B are to be unlocked.

In a case where the first movable frame 22A and the second movable frame 22B are to be locked, the first movable frame 22A and the second movable frame 22B are moved by the VCMs 30A and 30B such that the first movable frame 22A and the second movable frame 22B abut onto the first restriction portion and the second restriction portion respectively. Thereafter, the electric motor 52 is driven such that the locking member 40-9 is moved to the locking position (inserted into space between first engagement portion 24A and second engagement portion 24B). Accordingly, the first movable frame 22A is locked by being interposed between the first restriction portion and an object side end portion of the locking member 40-9 and the second movable frame 22B is locked by being interposed between the second restriction portion and an image formation side end portion of the locking member 40-9.

As with the fourth embodiment shown in FIG. 11 or the like, the locking member 40-9 in a locked state is held at the locking position even in a case where the electric motor 52 enters a non-electrification state, because of a frictional force generated between an abutting surface between an object side end surface of the locking member 40-9 and the first engagement portion 24A and an abutting surface between an image formation side end surface of the locking member 40-9 and the second engagement portion 24B.

Note that, a configuration in which a recess portion is formed in at least one of the first engagement portion 24A or the second engagement portion 24B and the locking member 40-9 engages with the recess portion may also be adopted and in this case, it is possible to reliably fix the locking member 40-9 at the locking position by means of the recess portion, as with the fifth embodiment shown in FIG. 14. In addition, the worm gear 56 shown in FIG. 1 may be incorporated as a power transmission mechanism between the electric motor 52 and the locking member 40-9 and in this case, it is possible to hold the locking member 40-9 at the locking position by means of the irreversible rotation function of the worm gear 56 even in a case where the electric motor 52 enters a non-electrification state.

<Second Locking Mechanism Applied to Lens Barrel 1-9>

Figure 24:
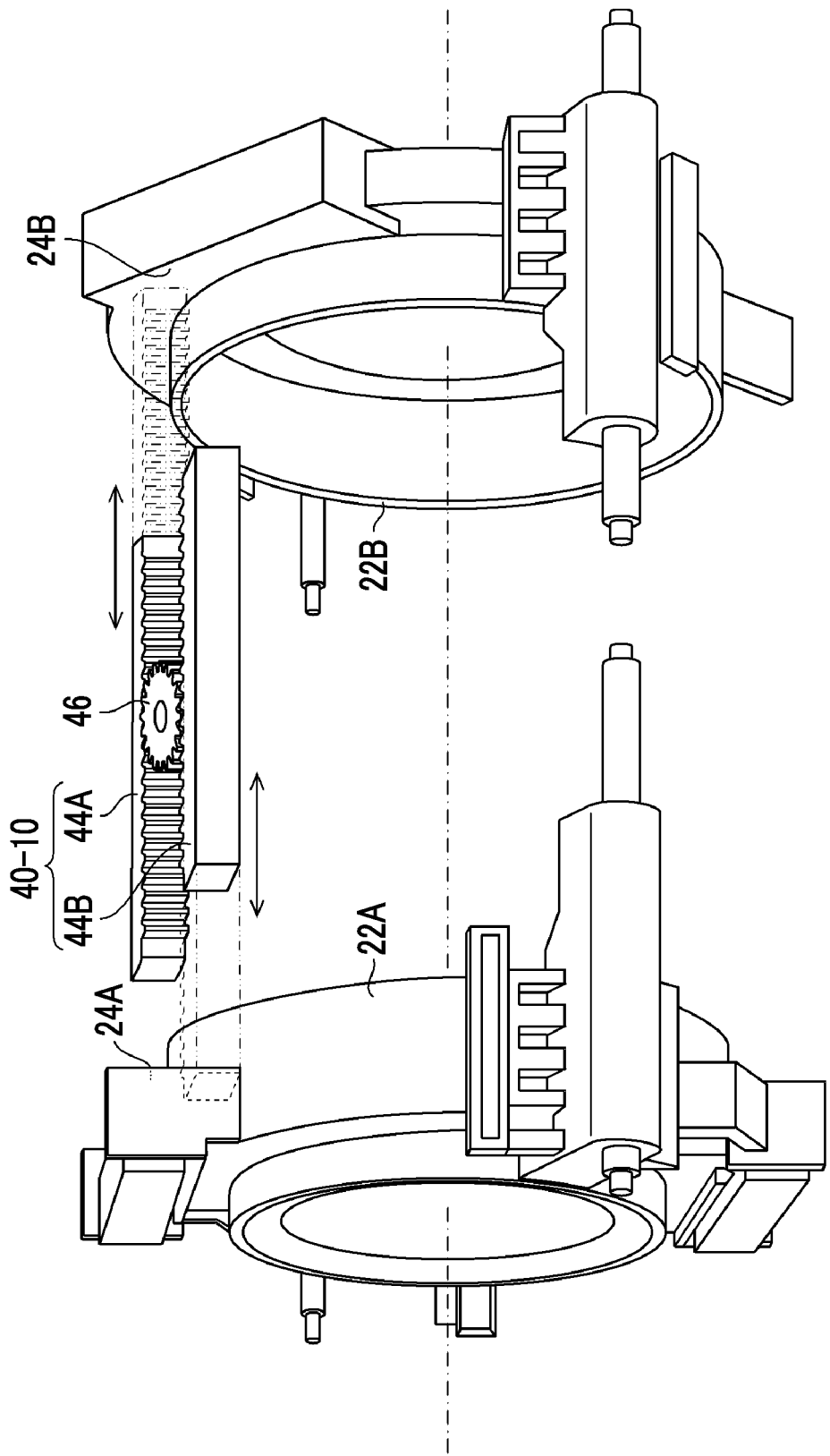
FIG. 24 is a perspective view showing a second locking mechanism applied to the lens barrel shown in FIG. 22.

FIG. 24 is a perspective view showing a second locking mechanism applied to the lens barrel shown in FIG. 22.

The second locking mechanism shown in FIG. 24 locks the first movable frame 22A and the second movable frame 22B at the same time and includes a first restriction portion and a second restriction portion (not shown) that are provided on the fixed frame 10 (FIG. 22), the first engagement portion 24A and the second engagement portion 24B provided on the first movable frame 22A and the second movable frame 22B respectively, and a locking member 40-10.

Each of the first restriction portion and the second restriction portion is configured in the same manner as the restriction portion 12 supported by the elastic member 62 shown in FIG. 11, the first restriction portion is a member that abuts onto the first movable frame 22A at an object side end portion of the movable range of the first movable frame 22A and restricts the movement of the first movable frame 22A, and the second restriction portion is a member that abuts onto the second movable frame 22B at an image formation side end portion of the movable range of the second movable frame 22B and restricts the movement of the second movable frame 22B.

The locking member 40-10 has a first rack portion 44A that is supported to be movable along the optical axis of optical members (first focus lens 20A and second focus lens 20B) and of which teeth are linearly arranged along the optical axis, a second rack portion 44B that is supported to be movable along the optical axis and of which teeth are linearly arranged along the optical axis, and a pinion gear 46 that is disposed between the first rack portion 44A and the second rack portion 44B and is rotated by a rotational driving force from an electric actuator such that the first rack portion 44A and the second rack portion 44B move in opposite directions.

The first rack portion 44A and the second rack portion 44B constituting the locking member 40-10 are movable in the opposite directions between unlocking positions represented by solid lines in FIG. 24 and locking positions represented by two-dot chain lines with the pinion gear 46 driven. That is, it is possible to move the first movable frame 22A and the second movable frame 22B to end portions of the movable ranges thereof at which the first movable frame 22A and the second movable frame 22B abut onto the first restriction portion and the second restriction portion respectively by causing the VCM 30 to enter a non-electrification state such that the movement of the first movable frame 22A and the second rack portion 44B in the optical axis direction is made free and driving the pinion gear 46 such that the first rack portion 44A and the second rack portion 44B move in the opposite directions.

In addition, it is possible to lock the first movable frame 22A and the second movable frame 22B at the same time by fixing the first rack portion 44A and the second rack portion 44B to become unable to move at the locking positions represented by two-dot chain lines.

It is possible to lock the first rack portion 44A and the second rack portion 44B by making the pinion gear 46 unable to rotate, for example, by using the spur gear 57 included in the electric actuator 50 shown in FIG. 6 as the pinion gear 46. That is, because of the irreversible rotation function of the worm gear 56, the spur gear 57 (pinion gear 46) can be made unable to rotate even in a case where the electric motor 52 enters a non-electrification state.

[Others]

In the present embodiments, the focus lens has been described as an example of the optical member. However, the present invention can be applied to any optical member that is driven in the optical axis direction by a linear motor such as a VCM.

In addition, the electric actuator is not limited to an electric actuator that uses an electric motor, and may be, for example, an electric actuator that uses a solenoid causing a movable iron core to move forward and backward by means of an electromagnetic force. As the solenoid in this case, a self-holding type solenoid capable of holding the position of the movable iron core at two positions (locking position and unlocking position) is preferable.

In addition, the holding mechanism holding the locking member such that the movable frame is not unlocked is not limited to those in the present embodiments and various holding mechanisms are conceivable. The point is that any mechanism can be used as long as the mechanism can hold the locking member such that the locking member does not move (is not unlocked) even in a case where the lens barrel is shaken and an external force is repeatedly applied to the locking member via the movable frame without using electric power.

The present invention is not limited to the above-described embodiments, and it is a matter of course that various modifications can be made without departing from the spirit of the present invention.

EXPLANATION OF REFERENCES 1, 1-2, 1-3, 1-4, 1-5, 1-6, 1-7, 1-8, 1-9: lens barrel
4: lens side CPU
6: lens side communication unit
8: lens mount
10: fixed frame
10A: supporting member
12: restriction portion
13: main shaft
14: sub shaft
20: focus lens
20A: first focus lens
20B: second focus lens
22: movable frame
22A: first movable frame
22B: second movable frame
24, 24-1, 24-2: engagement portion
24A: first engagement portion
24B: second engagement portion
25A, 25B: recess portion
30, 30A, 30B: VCM
32A: coil portion
32B: magnet
32C: yoke
40: locking ring
40-2, 40-3, 40-4, 40-8, 40-9, 40-10: locking member
40-8A: light blocking member
40A: locking portion
40B: gear
44A: first rack portion
44B: second rack portion
46: pinion gear
50: electric actuator
52: electric motor
52A, 52B: bearing portion
54: washer
56: worm gear
56A: worm
56B: worm wheel
57: spur gear
58A: first gear
58B: second gear
62: elastic member
64: spring member (tension spring)
65: stopper
66A: first pin
66B: second pin
67: O-ring
68A: first stopper
68B: second stopper
69: photo interrupter
70: abutting member
80: first shock absorbing material
82: second shock absorbing material
100: imaging device
110: camera main body
112: image sensor
120: main body side CPU
130: operation unit
140: main body side communication unit
150: main body mount
160: battery
170: power source control unit
L: optical axis
γ: lead angle

What is claimed is:

1. A lens barrel comprising:
a fixed frame;
a movable frame that holds an optical member and is supported by the fixed frame to be movable along an optical axis direction of the optical member;
a linear motor that drives the movable frame in the optical axis direction of the optical member;
a restriction portion that is provided on the fixed frame, abuts onto the movable frame at an end portion on one side of a movable range of the movable frame, and restricts movement of the movable frame;
an engagement portion provided on the movable frame;
a locking member that moves between a first position at which the locking member engages with the engagement portion of the movable frame and a second position at which the locking member is withdrawn from the engagement portion of the movable frame, the locking member fixing the movable frame between the restriction portion and the locking member in a case where the movable frame moves to a position at which the movable frame abuts onto the restriction portion and the locking member moves to the first position;

an electric actuator that causes the locking member to move between the first position and the second position; and a holding mechanism that holds the locking member at the first position in a case where the electric actuator is turned off in a state where the movable frame is fixed by the locking member, wherein an abutting member that is provided on the fixed frame, is provided at least on a side opposite to the engagement portion of the movable frame with respect to the locking member having moved to the first position, and receives a force applied to the locking member from the movable frame via the engagement portion, wherein the abutting member is separate from the electric actuator, and wherein a first shock absorbing material is disposed on at least one of the restriction portion or an abutting portion of the movable frame that abuts onto the restriction portion and a second shock absorbing material is disposed on at least one of the engagement portion of the movable frame or the locking member.

2. The lens barrel according to claim 1,
wherein the optical member is a focus lens.

3. The lens barrel according to claim 1,
wherein the linear motor is a voice coil motor.

4. The lens barrel according to claim 1, further comprising:

a position detection unit that detects whether or not the locking member is held at the first position.

5. An imaging device comprising:
the lens barrel according to claim 1.

6. The imaging device according to claim 5,
wherein the lens barrel is an interchangeable lens.

7. The imaging device according to claim 5, further comprising:

an instruction input reception unit that receives an instruction to cause the imaging device to enter an image-capturable state or an image-uncapturable state;

a linear motor control unit that drives the linear motor such that the movable frame is moved to a position at which the movable frame abuts onto the restriction portion in a case where the instruction input reception unit receives an instruction to cause the imaging device to enter the image-uncapturable state;

an electric actuator control unit that drives the electric actuator such that the locking member is moved from the second position to the first position in a case where the movable frame moves to the position at which the movable frame abuts onto the restriction portion; and a power source control unit that turns off a power source driving at least the linear motor and the electric actuator in a case where the locking member is moved to the first position.

8. The imaging device according to claim 7,
wherein the power source control unit turns on the power source driving at least the linear motor and the electric actuator in a case where the instruction input reception unit receives an instruction to cause the imaging device to enter the image-capturable state, and wherein the electric actuator control unit drives the electric actuator such that the locking member is moved from the first position to the second position in a case where the instruction input reception unit receives an instruction to cause the imaging device to enter the image-capturable state and the power source driving the electric actuator is turned on.

9. A lens barrel comprising:
a fixed frame;

a movable frame that holds an optical member and is supported by the fixed frame to be movable along an optical axis direction of the optical member;

a linear motor that drives the movable frame in the optical axis direction of the optical member;

a restriction portion that is provided on the fixed frame, abuts onto the movable frame at an end portion on one side of a movable range of the movable frame, and restricts movement of the movable frame;

an engagement portion provided on the movable frame;

a locking member that moves between a first position at which the locking member engages with the engagement portion of the movable frame and a second position at which the locking member is withdrawn from the engagement portion of the movable frame, the locking member fixing the movable frame between the restriction portion and the locking member in a case where the movable frame moves to a position at which the movable frame abuts onto the restriction portion and the locking member moves to the first position;

an electric actuator that causes the locking member to move between the first position and the second position; and a holding mechanism that holds the locking member at the first position in a case where the electric actuator is turned off in a state where the movable frame is fixed by the locking member, wherein the optical member has a first optical member on an object side and a second optical member on an image formation side, wherein the movable frame includes a first movable frame that holds the first optical member and is supported by the fixed frame to be movable along the optical axis direction and a second movable frame that holds the second optical member and is supported by the fixed frame to be movable along the optical axis direction, wherein the linear motor includes a first linear motor that drives the first movable frame in the optical axis direction and a second linear motor that drives the second movable frame in the optical axis direction, wherein the restriction portion includes a first restriction portion that abuts onto the first movable frame at an object side end portion of a movable range of the first movable frame and restricts movement of the first movable frame and a second restriction portion that abuts onto the second movable frame at an image formation side end portion of a movable range of the second movable frame and restricts movement of the second movable frame, wherein the engagement portion includes a first engagement portion provided on the first movable frame and a second engagement portion provided on the second movable frame, wherein the locking member fixes the first movable frame and the second movable frame with the first movable frame and the second movable frame interposed between the first restriction portion and the second restriction portion in a case where the locking member is positioned at the first position and is withdrawn from the movable ranges of the first movable frame and the second movable frame such that the first movable frame and the second movable frame are unfixed in a case where the locking member is positioned at the second position, and wherein the locking member has a length corresponding to an interval between the first engagement portion and the second engagement portion that is formed when the first movable frame and the second movable frame abut onto the first restriction portion and the second restriction portion respectively and the locking member is inserted into a space between the first engagement portion and the second engagement portion or withdrawn from the space between the first engagement portion and the second engagement portion.

10. A lens barrel comprising:
a fixed frame;
a movable frame that holds an optical member and is supported by the fixed frame to be movable along an optical axis direction of the optical member;
a linear motor that drives the movable frame in the optical axis direction of the optical member;
a restriction portion that is provided on the fixed frame, abuts onto the movable frame at an end portion on one side of a movable range of the movable frame, and restricts movement of the movable frame;
an engagement portion provided on the movable frame;
a locking member that moves between a first position at which the locking member engages with the engagement portion of the movable frame and a second position at which the locking member is withdrawn from the engagement portion of the movable frame, the locking member fixing the movable frame between the restriction portion and the locking member in a case where the movable frame moves to a position at which the movable frame abuts onto the restriction portion and the locking member moves to the first position;
an electric actuator that causes the locking member to move between the first position and the second position; and
a holding mechanism that holds the locking member at the first position in a case where the electric actuator is turned off in a state where the movable frame is fixed by the locking member,
wherein the optical member has a first optical member on an object side and a second optical member on an image formation side,
wherein the movable frame includes a first movable frame that holds the first optical member and is supported by the fixed frame to be movable along the optical axis direction and a second movable frame that holds the second optical member and is supported by the fixed frame to be movable along the optical axis direction,
wherein the linear motor includes a first linear motor that drives the first movable frame in the optical axis direction and a second linear motor that drives the second movable frame in the optical axis direction,
wherein the restriction portion includes a first restriction portion that abuts onto the first movable frame at an object side end portion of a movable range of the first movable frame and restricts movement of the first movable frame and a second restriction portion that abuts onto the second movable frame at an image formation side end portion of a movable range of the second movable frame and restricts movement of the second movable frame, wherein the engagement portion includes a first engagement portion provided on the first movable frame and a second engagement portion provided on the second movable frame,
wherein the locking member fixes the first movable frame and the second movable frame with the first movable frame and the second movable frame interposed between the first restriction portion and the second restriction portion in a case where the locking member is positioned at the first position and is withdrawn from the movable ranges of the first movable frame and the second movable frame such that the first movable frame and the second movable frame are unfixed in a case where the locking member is positioned at the second position, and
wherein the locking member has a first rack portion that is supported to be movable along an optical axis of the optical member and of which teeth are linearly arranged along the optical axis, a second rack portion that is supported to be movable along the optical axis and of which teeth are linearly arranged along the optical axis, and a pinion gear that is disposed between the first rack portion and the second rack portion and is rotated by a rotational driving force from an electric actuator such that the first rack portion and the second rack portion move in opposite directions.

11. A lens barrel comprising:
a fixed frame;
a movable frame that holds an optical member and is supported by the fixed frame to be movable along an optical axis direction of the optical member;
a linear motor that drives the movable frame in the optical axis direction of the optical member;
a restriction portion that is provided on the fixed frame, abuts onto the movable frame at an end portion on one side of a movable range of the movable frame, and restricts movement of the movable frame;
an engagement portion provided on the movable frame;
a locking member that moves between a first position at which the locking member engages with the engagement portion of the movable frame and a second position at which the locking member is withdrawn from the engagement portion of the movable frame, the locking member fixing the movable frame between the restriction portion and the locking member in a case where the movable frame moves to a position at which the movable frame abuts onto the restriction portion and the locking member moves to the first position;
an electric actuator that causes the locking member to move between the first position and the second position; and
a holding mechanism that holds the locking member at the first position in a case where the electric actuator is turned off in a state where the movable frame is fixed by the locking member,
wherein the locking member is supported to be rotationally movable around an optical axis of the optical member or rotationally movable around a rotation axis that is different from the optical axis of the optical member and is parallel to the optical axis,
wherein the electric actuator is composed of an electric motor and a power transmission mechanism that transmits a rotational driving force of the electric motor to the locking member and causes the locking member to rotationally move between the first position and the second position, and wherein the holding mechanism is a worm gear incorporated into the power transmission mechanism.

12. The lens barrel according to claim 11,
wherein a lead angle of the worm gear is equal to or smaller than 20 degrees.

13. A lens barrel comprising:
a fixed frame;
a movable frame that holds an optical member and is supported by the fixed frame to be movable along an optical axis direction of the optical member;
a linear motor that drives the movable frame in the optical axis direction of the optical member;
a restriction portion that is provided on the fixed frame, abuts onto the movable frame at an end portion on one side of a movable range of the movable frame, and restricts movement of the movable frame;
an engagement portion provided on the movable frame;
a locking member that moves between a first position at which the locking member engages with the engagement portion of the movable frame and a second position at which the locking member is withdrawn from the engagement portion of the movable frame, the locking member fixing the movable frame between the restriction portion and the locking member in a case where the movable frame moves to a position at which the movable frame abuts onto the restriction portion and the locking member moves to the first position;
an electric actuator that causes the locking member to move between the first position and the second position; and
a holding mechanism that holds the locking member at the first position in a case where the electric actuator is turned off in a state where the movable frame is fixed by the locking member,
wherein the holding mechanism is an elastic member that elastically holds the restriction portion in the optical axis direction of the optical member, and
wherein, in a case where the linear motor causes the movable frame to abut onto the restriction portion and the elastic member is compressed, the locking member is movable by the electric actuator to the first position at which the locking member engages with the engagement portion.

14. A lens barrel comprising:
a fixed frame;
a movable frame that holds an optical member and is supported by the fixed frame to be movable along an optical axis direction of the optical member;
a linear motor that drives the movable frame in the optical axis direction of the optical member;
a restriction portion that is provided on the fixed frame, abuts onto the movable frame at an end portion on one side of a movable range of the movable frame, and restricts movement of the movable frame;
an engagement portion provided on the movable frame;
a locking member that moves between a first position at which the locking member engages with the engagement portion of the movable frame and a second position at which the locking member is withdrawn from the engagement portion of the movable frame, the locking member fixing the movable frame between the restriction portion and the locking member in a case where the movable frame moves to a position at which the movable frame abuts onto the restriction portion and the locking member moves to the first position;

an electric actuator that causes the locking member to move between the first position and the second position; and
a holding mechanism that holds the locking member at the first position in a case where the electric actuator is turned off in a state where the movable frame is fixed by the locking member,
wherein the locking member is supported to be rotationally movable around an axis that is different from the optical axis of the optical member and is parallel to the optical axis,
wherein the electric actuator is an electric motor that causes the locking member to rotationally move between the first position and the second position,
wherein the holding mechanism includes an elastic member that elastically holds the restriction portion in the optical axis direction of the optical member and the engagement portion in which a recess portion that inhibits rotational movement of the locking member in a case where the locking member engages with the recess portion is formed, and
wherein, in a case where the linear motor causes the movable frame to abut onto the restriction portion and the elastic member is compressed, the locking member is rotationally movable by the electric motor to the first position at which the locking member engages with the recess portion of the engagement portion.

15. A lens barrel comprising:
a fixed frame;
a movable frame that holds an optical member and is supported by the fixed frame to be movable along an optical axis direction of the optical member;
a linear motor that drives the movable frame in the optical axis direction of the optical member;
a restriction portion that is provided on the fixed frame, abuts onto the movable frame at an end portion on one side of a movable range of the movable frame, and restricts movement of the movable frame;
an engagement portion provided on the movable frame;
a locking member that moves between a first position at which the locking member engages with the engagement portion of the movable frame and a second position at which the locking member is withdrawn from the engagement portion of the movable frame, the locking member fixing the movable frame between the restriction portion and the locking member in a case where the movable frame moves to a position at which the movable frame abuts onto the restriction portion and the locking member moves to the first position;
an electric actuator that causes the locking member to move between the first position and the second position; and
a holding mechanism that holds the locking member at the first position in a case where the electric actuator is turned off in a state where the movable frame is fixed by the locking member,
wherein the locking member is supported to be rotationally movable around an axis that is different from the optical axis of the optical member and is parallel to the optical axis,
wherein the electric actuator is an electric motor that causes the locking member to rotationally move between the first position and the second position,
wherein the holding mechanism is a spring member that becomes resistance against rotational movement of the locking member in a direction toward the second position in a case where the locking member rotationally moves to the first position, wherein the spring member is a tension spring that is disposed between the locking member and the fixed frame, wherein the first position and the second position of the locking member are positioned on opposite sides with a neutral position, at which the tension spring expands most, interposed therebetween, wherein the tension spring urges the locking member in a direction toward the first position in a case where the locking member rotationally moves in the direction toward the first position beyond the neutral position, and wherein the tension spring urges the locking member in a direction toward the second position in a case where the locking member rotationally moves in the direction toward the second position beyond the neutral position.

16. The lens barrel according to claim 15, further comprising:
a first stopper and a second stopper that restrict a rotational movement range of the locking member against an urging force by the tension spring.

17. The lens barrel according to claim 16, further comprising:
a first gear that is provided on a shaft of the electric motor; and
a second gear that is provided to be coaxial with the axis of the locking member and to which a rotational driving force is transmitted from the electric motor via at least the first gear,
wherein one end of the tension spring is fixed to the fixed frame and the other end of the tension spring is fixed to a pin embedded in the second gear.

18. The lens barrel according to claim 17,
wherein the pin abuts onto the first stopper in a case where the locking member rotationally moves to the first position and the pin abuts onto the second stopper in a case where the locking member rotationally moves to the second position.

19. The lens barrel according to claim 18,
wherein the pin and the first stopper abut onto each other via an elastic body and the pin and the second stopper abut onto each other via the elastic body.

20. The lens barrel according to claim 19,
wherein the elastic body is an O-ring mounted onto the pin.

* * * * *